US010649776B2

(12) United States Patent
Navon et al.

(10) Patent No.: US 10,649,776 B2
(45) Date of Patent: *May 12, 2020

(54) SYSTEM AND METHOD FOR PREDICTION OF MULTIPLE READ COMMANDS DIRECTED TO NON-SEQUENTIAL DATA

(71) Applicant: Western Digital Technologies, Inc., San Jose, CA (US)

(72) Inventors: Ariel Navon, Revava (IL); Eran Sharon, Rishon Lezion (IL); Idan Alrod, Herzliya (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/226,021

(22) Filed: Dec. 19, 2018

(65) Prior Publication Data

US 2020/0004540 A1 Jan. 2, 2020

Related U.S. Application Data

(63) Continuation-in-part of application No. 16/024,617, filed on Jun. 29, 2018.

(51) Int. Cl.
*G06F 13/00* (2006.01)
*G06F 9/355* (2018.01)
(Continued)

(52) U.S. Cl.
CPC ............ *G06F 9/355* (2013.01); *G06F 3/0611* (2013.01); *G06F 3/0659* (2013.01);
(Continued)

(58) Field of Classification Search
CPC .... G06F 9/355; G06F 3/0611; G06F 12/0862; G06F 3/0683; G06F 3/0659; G06F 9/3832

See application file for complete search history.

(56) References Cited

U.S. PATENT DOCUMENTS 5,146,578 A 9/1992 Zangenehpour
5,586,294 A 12/1996 Goodwin et al.
(Continued)

FOREIGN PATENT DOCUMENTS

EP 0671684 A2 * 9/1995 ........... G06F 9/3806
WO WO-2008016849 A2 * 2/2008 ........... G06F 9/3804

OTHER PUBLICATIONS

International Search Report and Written Opinion in International Application No. PCT/US2019/017823, dated May 20, 2019, 13 pages.
(Continued)

*Primary Examiner* — Jing-Yih Shyu
(74) *Attorney, Agent, or Firm* — Brinks Gilson & Lione

(57) ABSTRACT

Systems and methods for predicting read commands and pre-fetching data when a memory device is receiving random read commands to non-sequentially addressed data locations are disclosed. A limited length search sequence of prior read commands is generated and that search sequence is then converted into an index value in a predetermined set of index values. A history pattern match table having entries indexed to that predetermined set of index values contains a plurality of read commands that have previously followed the search sequence represented by the index value. The index value is obtained via application of a many-to-one algorithm to the search sequence. The index value obtained from the search sequence may be used to find, and pre-fetch data for, a plurality of next read commands in the table that previously followed a search sequence having that index value.

19 Claims, 18 Drawing Sheets

(51) Int. Cl.
*G06F 3/06* (2006.01)
*G06F 9/38* (2018.01)
*G06F 12/0862* (2016.01)

(52) U.S. Cl.
CPC .......... *G06F 3/0683* (2013.01); *G06F 9/3832* (2013.01); *G06F 12/0862* (2013.01)

(56) References Cited

U.S. PATENT DOCUMENTS

| | | | |
|---|---|---|---|
| 5,659,713 | A | 8/1997 | Goodwin et al. |
| 5,761,464 | A | 6/1998 | Hopkins |
| 5,765,213 | A | 6/1998 | Ofer |
| 5,802,566 | A | 9/1998 | Hagersten |
| 6,092,149 | A | 7/2000 | Hicken et al. |
| 6,721,870 | B1 | 4/2004 | Yochai et al. |
| 6,976,147 | B1 * | 12/2005 | Isaac .................. G06F 12/0862 711/137 |
| 7,386,675 | B2 | 6/2008 | Fachan |
| 7,451,348 | B2 | 11/2008 | Pecone et al. |
| 8,225,047 | B2 | 7/2012 | Yano et al. |
| 8,539,163 | B1 | 9/2013 | Sivasubramanian et al. |
| 8,732,406 | B1 * | 5/2014 | Pase .................... G06F 12/0862 711/137 |
| 2003/0018849 | A1 * | 1/2003 | Takaichi ............... G06F 3/0601 711/113 |
| 2003/0149837 | A1 | 8/2003 | Coker et al. |
| 2006/0047914 | A1 | 3/2006 | Hofmann et al. |
| 2007/0016721 | A1 | 1/2007 | Gay |
| 2011/0126154 | A1 | 5/2011 | Boehler et al. |
| 2012/0030431 | A1 | 2/2012 | Anderson et al. |
| 2013/0124794 | A1 | 5/2013 | Bux et al. |
| 2013/0179460 | A1 | 7/2013 | Acuna et al. |
| 2014/0082324 | A1 | 3/2014 | Elhamias et al. |
| 2014/0281458 | A1 * | 9/2014 | Ravimohan ........... G06F 9/4401 713/2 |
| 2017/0075629 | A1 | 3/2017 | Manohar et al. |
| 2017/0255556 | A1 | 9/2017 | Peng et al. |
| 2018/0314421 | A1 | 11/2018 | Linkovsky et al. |
| 2019/0129834 | A1 | 5/2019 | Purkayastha et al. |

OTHER PUBLICATIONS

Adi Fuchs et al., "Loop-Aware Memory Prefetching Using Code Block Working Sets", 2014, 47th Annual IEEE/ACM International Symposium on Microarchitecture, pp. 533-544.
U.S. Appl. No. 15/497,547, filed Apr. 26, 2017.
Office Action in U.S. Appl. No. 16/024,617, dated Nov. 5, 2019, 8 pages.

* cited by examiner

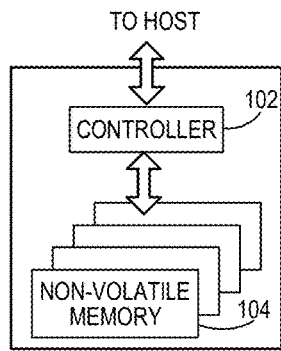
FIG. 1A
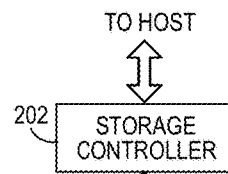
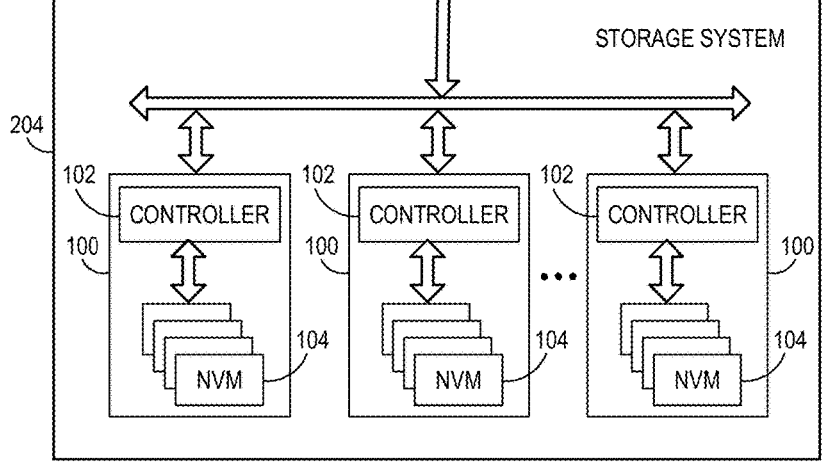
FIG. 1B
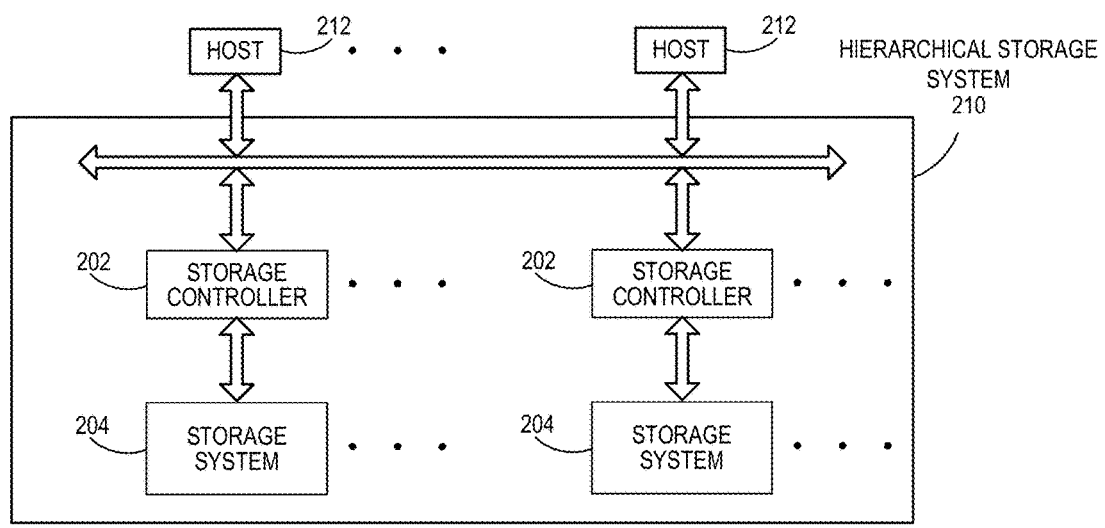
FIG. 1C

SYSTEM AND METHOD FOR PREDICTION OF MULTIPLE READ COMMANDS DIRECTED TO NON-SEQUENTIAL DATA

CROSS-REFERENCE TO RELATED APPLICATIONS

This application is a continuation-in-part of U.S. patent application Ser. No. 16/024,617, filed Jun. 29, 2018, pending, the entirety of which is hereby incorporated by reference herein.

BACKGROUND

Storage systems, such as solid state drives (SSDs) including NAND flash memory, are commonly used in electronic systems ranging from consumer products to enterprise-level computer systems. SSDs and similar storage devices are often rated on how fast they can respond to requests from a host device, commonly referred to as read requests, to access and retrieve data from the storage device. Another metric used to rate storage devices is throughput, generally meaning the average number of operations completed per unit of time. A read request triggers a sequence of actions in a storage device that culminates in the host device obtaining the requested data. For example, one action in the sequence of actions performed by a storage device may be translating a logical address for the data requested in the read request to a physical address where that requested data is located.

Each action in the sequence of actions performed by the storage device takes a certain amount of time. When a host is requesting data from a storage device in a sequential read mode, where the storage device receives requests to read large chunks of data that include a consecutive address space, the storage device may operate in a sequential read mode, since it knows where to look to pre-fetch data. The pre-fetched data would be the next amount of data that is sequentially contiguous in the logical address space with the data being retrieved in the current read command. By not waiting for the next read command to arrive and instead predicting the location of the data for that next read command, a storage device may improve performance by starting the sequence of actions for the predicted next read while already working on the prior read command. Although attempting to pre-fetch data in anticipation of a next read command may work for sequential mode read commands where data is contiguous, when the received read commands are for random, rather than sequential, address groups of data, the typical pre-fetch techniques, such as read look ahead mechanisms, may not provide any performance advantage at the storage device, and may, in fact, slow down the storage device and/or increase power usage due to pre-fetching incorrect data.

BRIEF DESCRIPTION OF THE DRAWINGS

FIG. 1A is a block diagram of an example non-volatile memory system.

FIG. 1B is a block diagram illustrating an exemplary storage module.

FIG. 1C is a block diagram illustrating a hierarchical storage system.

DETAILED DESCRIPTION

Figure 2A:
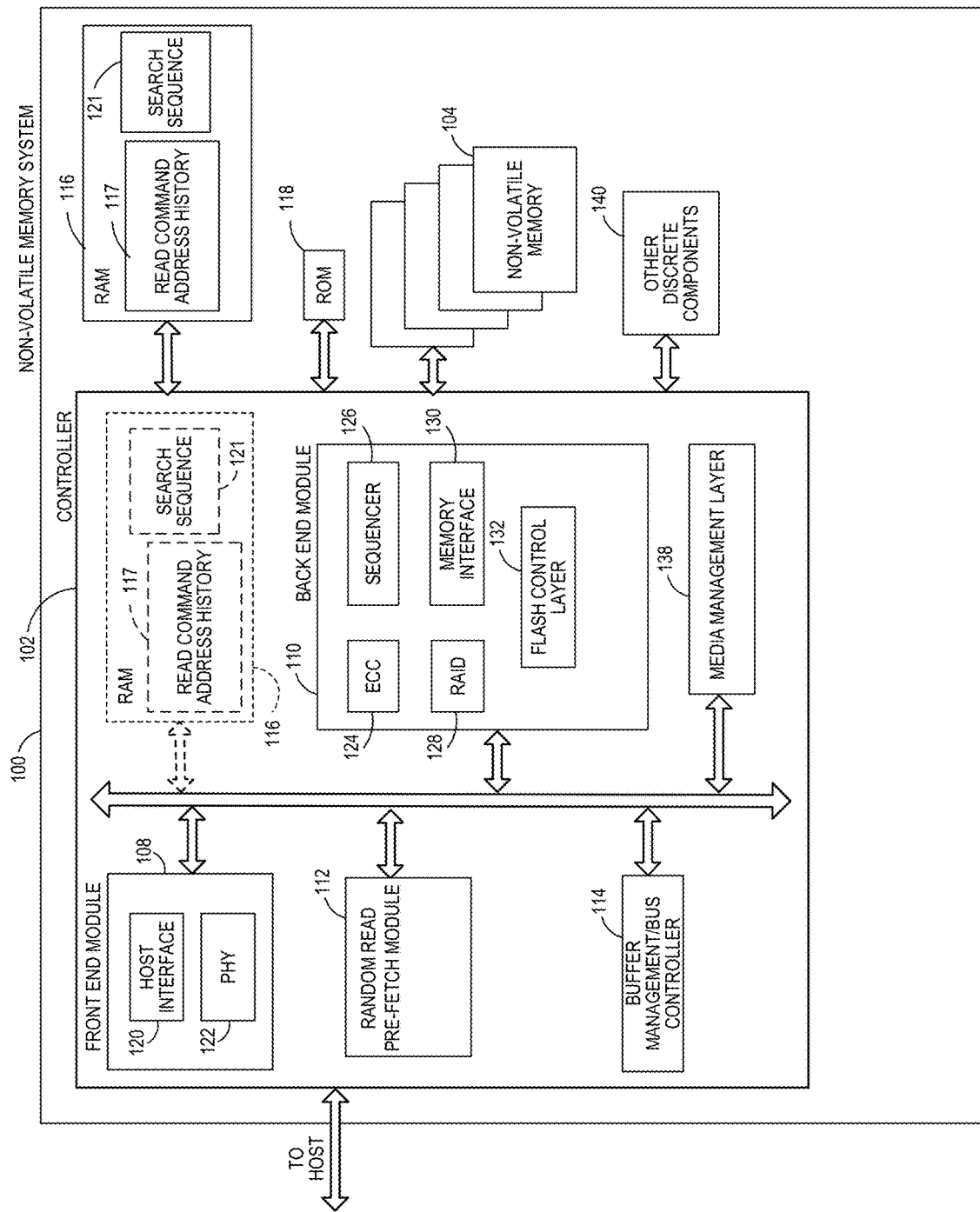
FIG. 2A is a block diagram illustrating exemplary components of a controller of a non-volatile memory system.

In order to improve performance of a storage device when receiving read request in a random read mode, where consecutive read commands include requests to read non-consecutive sequences of addresses, a system and method for managing random read mode read requests is disclosed below.

As used herein, random data, which may also be referred to herein as random read mode data, describes data addresses associated with consecutive read requests where the data addresses for data requested in a first read command are not consecutive with data addresses for data in an immediately following next read command. Also, random read mode data may include short command length read commands where a read command may not be broken down into several successive commands of sequential data. Situations where the type and location of upcoming read commands are unknown may occur during execution of specific applications where the memory device will receive more random read commands with a low command queue depth such that the memory device cannot see upcoming read commands in a queue and pre-fetch data accordingly.

An example of a sequential read is the read operations that occur when copying a folder from a hard-disk/SSD to a Universal Serial Bus (USB) drive. In this example, the data chunk size may be in terms of gigabytes (GBs) of continuously addressed data that is serially read. In contrast, one example of an operation characterized by mostly random read operations is a ZIP compression operation, where successive multiple accesses to a database occur in a non-sequential manner. Although a given read command typically includes a sequential address for data to be read for that read command, the sequential run of data addresses in that read command may be non-sequential with the sequential run of data associated with a next read command from a same or different host application. Also, although the non-sequential runs of data are referred to herein as random data reads (or random read mode reads), there may be cases where there is some predictability, on a larger command grouping scale, where the otherwise random location and/or amount of the next read command can be predicted. For example, if activity on a host tends to lead to a certain group of reads being clustered together, then that same cluster of read commands accessing data at the same locations may repeat. To take advantage of this potential read command pattern correlation, methods and systems to predict random reads are provided below.

In a first aspect, a memory device is disclosed having a first memory, and a second memory. The second memory may include a search sequence buffer and a prior read command data structure, where the prior read command data structure has only a predetermined number of entries that are each indexed with a respective index value within a predetermined range of index values. The memory device may further include a controller in communication with the first memory and the second memory. The controller may be configured to receive a current read command having read command data including a start logical block address (LBA) and a data length, where the start LBA of the current read command is discontiguous with an address range associated with a last read command received prior to the current read command. The controller may be configured to generate a search sequence in the search sequence buffer based on at least the current read command. The controller is also configured to calculate an index value based on the search sequence that is within the predetermined range of index values. Once the index value is calculated, the controller is then configured to retrieve, from an entry in the prior read command data structure indexed by the calculated index value, address data representative of a sequence of historical next read commands associated with the calculated index value. With this retrieved address data, the controller may then pre-fetch data from the first memory to the second memory, where the historical next read commands represent a predicted sequence of next read command for the controller to use to pre-fetch data prior to receiving the next read command. In some implementations, the search sequence comprises the current read command and at least on command received prior to the current read command.

According to another aspect, a method for predicting multiple random read commands is described. The method may include receiving at a memory device a current read command for data located at a starting address that is discontiguous with an address range associated with the last read command received prior to the current read command. The controller of the memory device may then generate a search sequence of multiple prior read commands, including at least the current read command and the last read command. The method continues with the controller calculating, based on the search sequence, an index value within a predetermined range of index values, where the calculated index value is calculated based on the search sequence. The method continues with the controller retrieving, from an entry in a prior read command data structure stored in a first memory of the memory device, where the entry is indexed by the calculated index value, data representative of a historical next read command associated with the calculated index value. The method continues with pre-fetching data from a second memory of the memory device to the first memory of the memory device based on the predetermined plurality of historical next read commands associated with the calculated index value.

In different implementations of the method, the step of calculating, based on the search sequence, the index value may include the controller applying a many-to-one mapping function to the search sequence to assign one of the predetermined range of index values as the index value. The many-to-one mapping function may be a low latency function, such as an O(1) complexity function. For example, the O(1) complexity function may be a hash function followed by a modulo operation. The controller may apply a value of the generated search sequence as input for the hash function and process the result of that hash function with a modulo operation that is configured to provide an output limited to index values in the predetermined range.

Referring now to FIG. 1A, a block diagram illustrating a non-volatile memory system is shown. The non-volatile memory (NVM) system 100, which may also be referred to herein as a memory device, includes a controller 102 and non-volatile memory that includes one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, one or more microprocessors or processors (also referred to herein as central processing units (CPUs)), and a computer-readable medium that stores computer-readable program code (e.g., software or firmware) executable by the (micro)processors, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cells (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural NVM systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interconnect express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

FIG. 2A is a block diagram illustrating exemplary components of controller 102 in more detail. Controller 102 includes a front-end module 108 that interfaces with a host, a back-end module 110 that interfaces with the one or more non-volatile memory die 104, and various other modules that perform functions that will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a random read pre-fetch module 112 present on the die of the controller 102. As described below, the random read pre-fetch module 112 may provide functionality for predicting the data that will be requested in a next data read and pre-fetching that predicted data before the next command is received. The random read pre-fetch module 112 of the controller 102 may accomplish this by comparing a pattern of data locations formed by a current read command and a predetermined number of prior read command data locations and comparing that search sequence 121 to sequentially ordered prior commands in a datastore, such as a read command history database 117. If the search sequence 121 matches a sequential pattern of read command address information in the read command history data base 117, the random read pre-fetch module 112 will select the next read command address immediately following the matched sequence in the database and use that to identify and pre-fetch data for a predicted next read command.

As also described in greater detail herein, in other implementations a large read command history database 117 and sequential comparison of a search sequence 121 to that database may be avoided by the pre-fetch module generating a smaller type of datastore for the read command history and then utilizing a many-to-one conversion of search sequences to search the abridged read command history. In yet other implementations, the pre-fetch module 112 may be configured to predict more than one next read command and pre-fetch data for multiple predicted next read commands at one time, or pre-fetch as many of the multiple predicted next read commands at a time as system configurations permit, where the multiple predicted next reads may be pre-fetched during what would otherwise be memory device idle times (when no host commands are pending). In yet other implementations, when using an abridged version of a read command history database, a uniqueness identifier tied to a particular search sequence may be included in the read command history database to decrease the likelihood of an erroneous pre-fetch that may occur in an abridged read command history database where different search sequences have the same many-to-one index value command history database.

A buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller. Further, in some implementations, the controller 102, RAM 116, and ROM 118 may be located on separate semiconductor die.

The RAM 116 in the NVM system 100, whether outside the controller 102, inside the controller or present both outside and inside the controller 102, may contain a number of items, including a copy of one or more pieces of the logical-to-physical mapping tables and group address tables (GAT) for tracking mappings between logical groups for the NVM system 100. The RAM 116 may contain the read command history database 117 that, in one embodiment, may be a sequential list of read command data address information for prior read command data locations, where sequential in this context refers to the fact that the list is organized in the time ordered sequence of arrival of the prior read commands at the controller 102. The RAM 116 may also include a search sequence 121 of the current read command data location information and read command address information for a fixed number of sequentially prior read commands. As described in greater detail below, this search sequence may be used to compare against the read command history to predict the next read command data and pre-fetch that data.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the NVM system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of NVM system 100 illustrated in FIG. 2A include the media management layer 138, which performs wear leveling of memory cells of non-volatile memory die 104 and manages mapping tables and logical-to-physical mapping or reading tasks. NVM system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
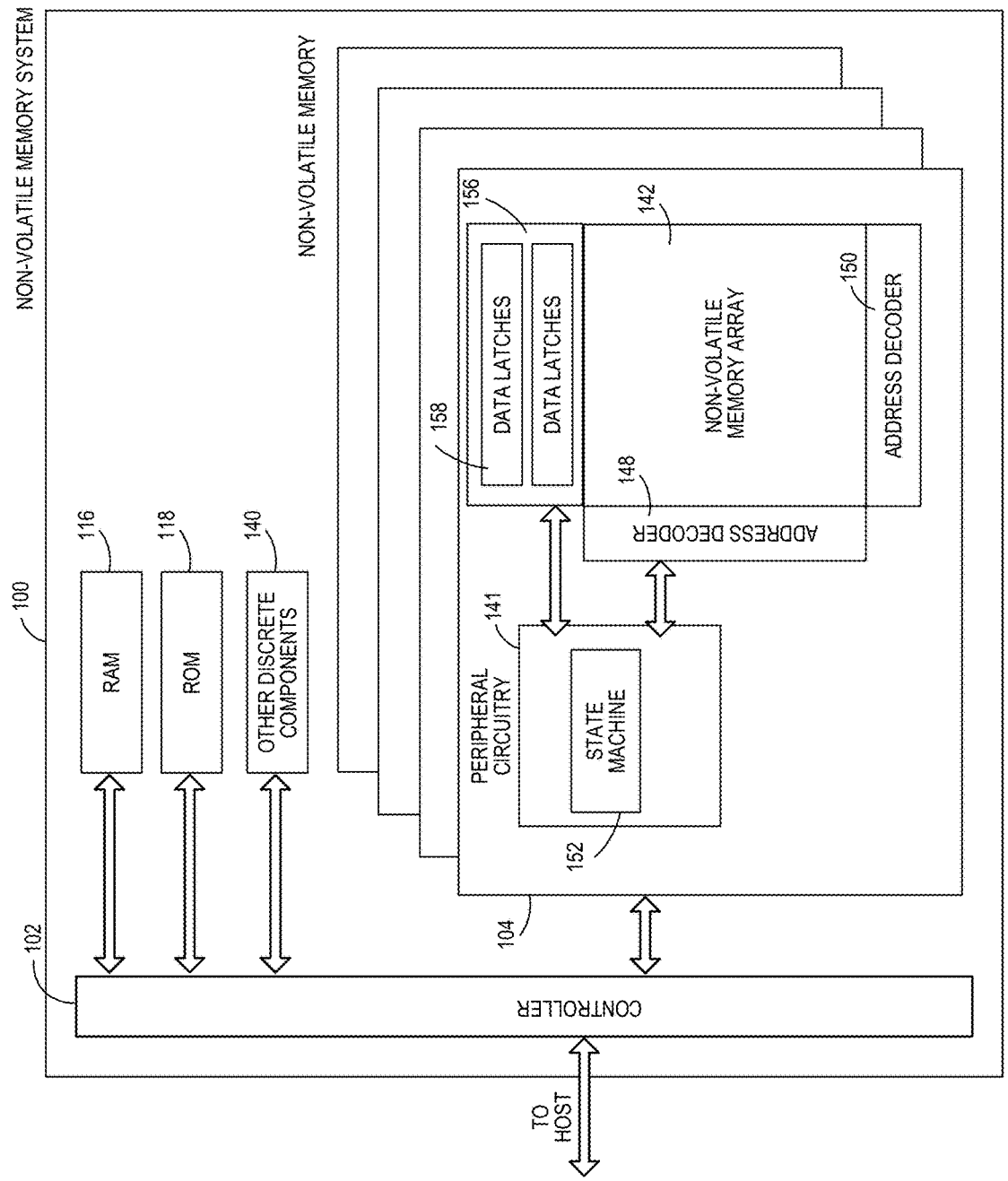
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data and includes address decoders 148, 150. The non-volatile memory cells may be any suitable non-volatile memory cells, including NAND flash memory cells and/or NOR flash memory cells in a two-dimensional and/or three-dimensional configuration. Peripheral circuitry 141 includes a state machine 152 that provides status information to controller 102. Non-volatile memory die 104 further includes a data cache 156 that caches data being read from or programmed into the non-volatile memory cells of the non-volatile memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include N data latches where each data latch can store 1 bit of data.

In one implementation, an individual data latch may be a circuit that has two stable states and can store 1 bit of data, such as a set/reset, or SR, latch constructed from NAND gates. The data latches 158 may function as a type of volatile memory that only retains data while powered on. Any of a number of known types of data latch circuits may be used for the data latches in each set of data latches 158. Each non-volatile memory die 104 may have its own sets of data latches 158 and a non-volatile memory array 142. Peripheral circuitry 141 includes a state machine 152 that provides status information to controller 102. Peripheral circuitry 141 may also include additional input/output circuitry that may be used by the controller 102 to transfer data to and from the latches 158, as well as an array of sense modules operating in parallel to sense the current in each non-volatile memory cell of a page of memory cells in the non-volatile memory array 142. Each sense module may include a sense amplifier to detect whether a conduction current of a memory cell in communication with a respective sense module is above or below a reference level.

Figure 3:
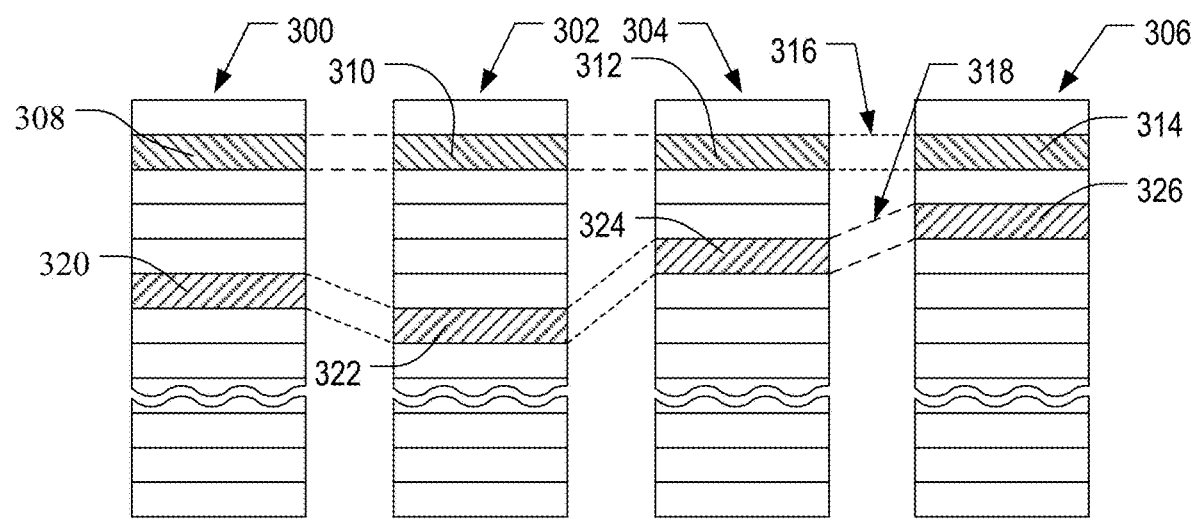
FIG. 3 illustrates an example physical memory organization of the non-volatile memory system of FIG. 1A.

The non-volatile flash memory array 142 in the non-volatile memory 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

The individual blocks are in turn divided for operational purposes into pages of memory cells, as illustrated in FIG.

Figure 4:
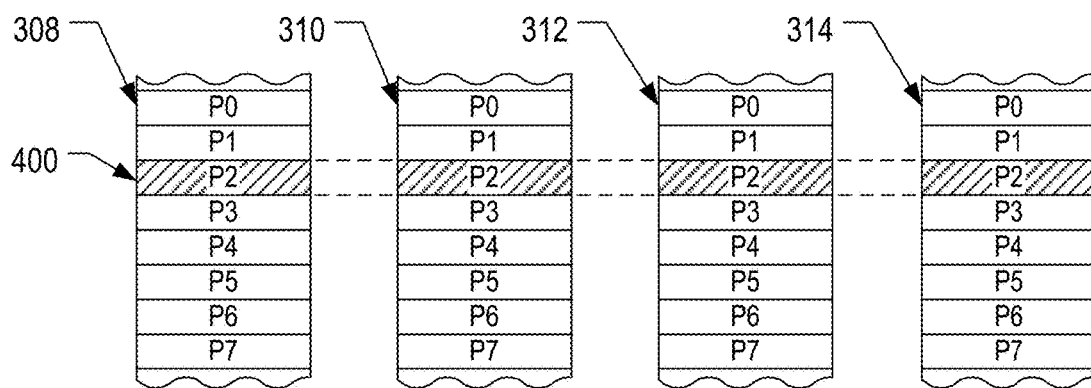
FIG. 4 shows an expanded view of a portion of the physical memory of FIG. 3.

4. The memory cells of each of blocks 308, 310, 312 and 314, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 400 is illustrated in FIG. 4 as formed of one physical page for each of the four blocks 308, 310, 312 and 314. The metapage 400 includes the page P2 in each of the four blocks but the pages of a metapage need not necessarily have the same relative position within each of the blocks. A metapage is typically the maximum unit of programming, although larger groupings may be programmed. The blocks disclosed in FIGS. 3-4 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the non-volatile memory system 100 where the data is physically stored.

Figure 5:
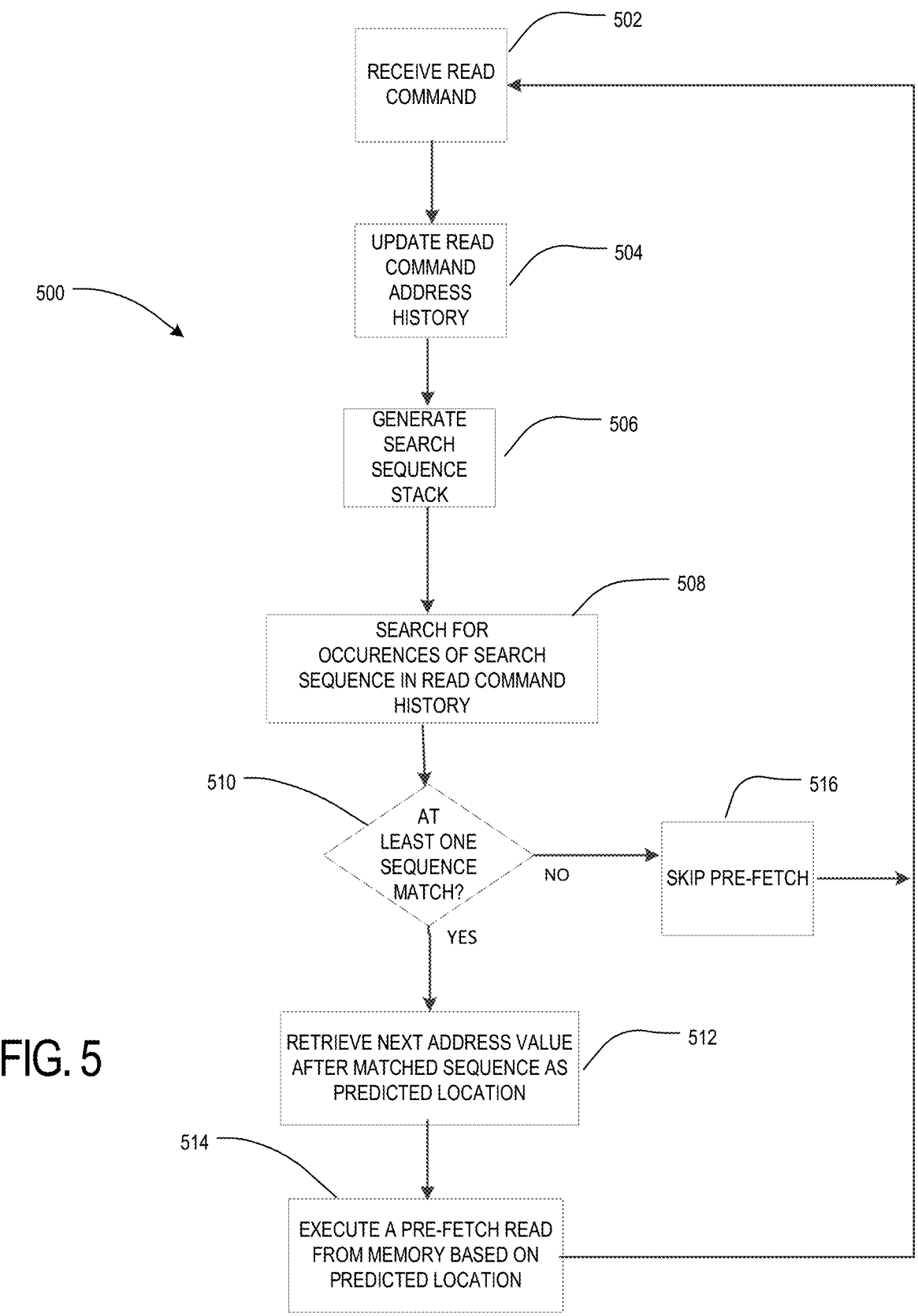
FIG. 5 is a flow diagram illustrating one implementation of predicting and pre-fetching data for random data reads utilizing a non-volatile memory.

Referring to FIG. 5, a read command data prediction and pre-fetch technique 500 for sequential read commands directed to data at non-sequential LBAs, also referred to herein as random read commands, is shown. Utilizing a memory, such as NVM system 100 of FIGS. 2A-2B, a read command is received at the controller 102 (at 502). The read command may include logical address information identifying the starting logical block address (starting LBA) at which the data being requested begins, as well as a length indicator that identifies the contiguous logical block address range starting at the starting logical block address. Upon receipt of the read command, the random read pre-fetch module 112 of the controller 102 may update the read command history database 117 to include the starting address and length information (at 504).

The controller 102 may also generate a search sequence in a search sequence stack stored in the controller memory (at 506). The search sequence consists of a sequential list of read address location information from the current read command and from a previous N commands, where N may be a predetermined fixed integer. For example, in one implementation, N may be 8, and thus the search sequence would be the read address information for the current read command and the last 7 prior read commands arranged in a list or stack in time order of read command receipt. In the embodiment of FIG. 5, the read address information stored in each entry of the search sequence stack may include only the start LBA of the read command, or may include both the start LBA and the length information from the respective read commands. The search sequence stack may be a fixed-size search sequence buffer 121 in RAM 116 having space to hold N entries, where the oldest entry is removed from search sequence buffer 121 when the read address information from the current read command is inserted. Although the example search sequence (also referred to herein as a search sequence stack) example provided below assumes a set of N previous commands in addition to the current read command where N is greater than 0, in other implementations the entire search sequence may comprise only a single prior command such as the current read command.

Using the search sequence with the current search command search address information that has been generated and stored in the search sequence buffer 121, the controller 102 may search for any occurrences of the search sequence that appear in the read command history database 117 (at 508). Any of a number of database search techniques may be used by the controller 102 to try to find a match between the search sequence and read command data entries in the time ordered read command data entries of the database 117. For example, the search technique may include comparing the search sequence in the search sequence buffer 121 to the time ordered entries in the read command database 117 in reverse time order (from newest entries to oldest entries) until a match is found. Alternatively, the search sequence may be compared to the database entries in the opposite direction, starting with the oldest database entries up until the newest. In one embodiment, the controller 102 may scan the entire database looking for every match, or in other embodiments, the controller 102 may stop searching after finding a first match, or stop searching after any of a number of other pre-defined match scenarios.

If at least one match is found (at 510) to the search sequence in the read command database then the random read pre-fetch module of the controller 102 may retrieve the address value in the read command data immediately after (more recent in time order) the matched sequence. This retrieved address information is then considered to be the predicted location of data that is expected to be requested in the next read command (at 512). The controller 102 may then pre-fetch the data at that identified address and store the pre-fetched data in RAM 116 in anticipation that the next read command will ask for that data (at 514). If the next read command does ask for that pre-fetched data, then significant time has been saved and the pre-fetched data may be immediately sent to the host. If the next read command does not request the pre-fetched data, then a regular read operation for the data requested in the read command may be executed and the pre-fetched data simply discarded or written over.

If, instead of finding a match between the search sequence and entries of the read command history database, no match is found (at 510), then a pre-fetch operation may be skipped (at 516). Alternatively, some other pre-fetch address selection scheme may be used as a default, such as the controller pre-fetching data at the next sequentially contiguous address after the last address of data retrieved for the prior read command.

The accuracy and amount of time it takes to predict the next random read command and pre-fetch the data for that predicted next read command may be adjusted by adjusting the size of the read command history database 117 and the size of the search sequence buffer 121. In one implementation, the read command history database may be sized to hold data address information for 200,000 of the most recent read commands and the search sequence buffer 121 as discussed above, holds data address information for the 8 read commands (providing space for of the last 7 read commands and the most recently received read command). The larger the read command history database 117, the more likely it may be to find a match, but the time needed to parse the entire database and compare it to the search sequence also may increase. Similarly, length of the search sequence buffer 121 may be adjusted to suit the specific memory device application. For example, a longer search sequence (and thus larger search sequence buffer 121) may reduce the frequency of matches found if the memory device tends to have shorter patterns of read commands, and too short of a search sequence may result in more matches but less accurate predictions. The above-noted example sizes of the read command history database 117 and the search sequence buffer 121 are simply provided by way of example and other larger or smaller sizes for each may be implemented in different embodiments.

Figure 6:
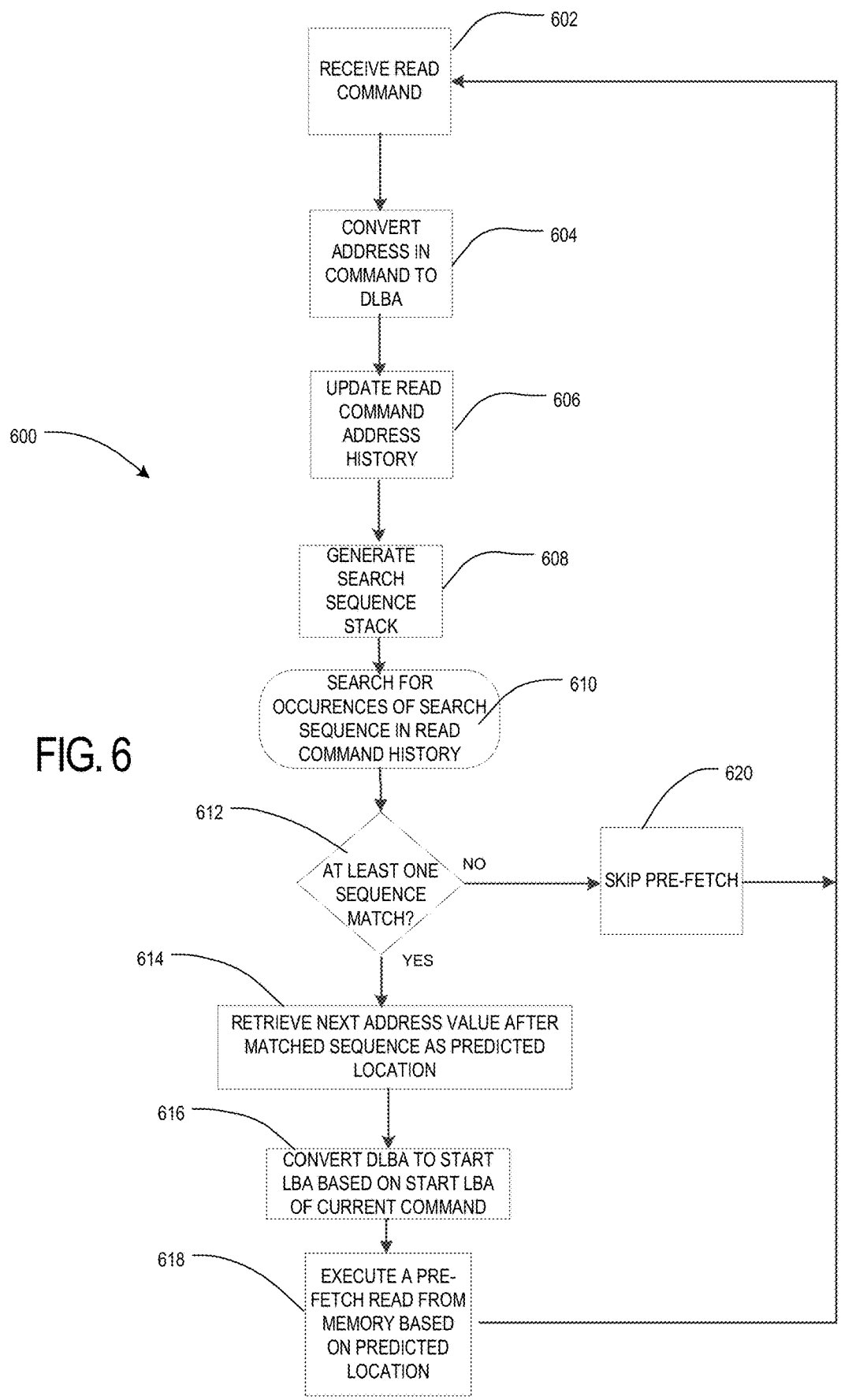
FIG. 6 is a flow diagram 600 illustrating an alternative implementation of the embodiment of FIG. 5.

In the method of FIG. 5, the controller 102, via the random read pre-fetch module 112, utilizes the start LBA address that comes in each read command to form the search sequence in the search sequence buffer 121 and to populate the read command history database 117. In an alternative implementation, as shown in FIG. 6, the method and system may be adapted to determine and use a differential LBA (also referred to herein as a delta LBA or DLBA) rather than the start LBA. A DLBA is determined for each read command by taking the start LBA provided in the current read command and calculating the difference between it and the start LBA of the immediately prior received read command. For example, if the start LBA of the last read command was 2000 and the start LBA of the current read command is 5000, then the DLBA would be 3000. A direction of the DLBA may also be included to account for situations where a lower start LBA is in the current read command. For example, if the start LBA of the last read command was 5000 and the start LBA of the current read command is 2000, the DLBA would be −3000.

Use of DLBA rather than start LBA in the process of FIG. 6 may reduce the number of unique values in the search sequence and read command history database and increase the potential pattern-matching rate. As shown in FIG. 6, the method for using DLBA information includes first receiving a read command (at 602), but then converting the start LBA that arrives in the read command into a DLBA (at 604). In one implementation, to convert the start LBA to a DLBA, the controller 102 stores the start LBA of both the current and immediate prior read command in a start LBA buffer. The start LBA buffer may be any of a number of memory locations in the controller 102 or the memory device 100 generally. The controller may then subtract the value of the start LBA of the immediate prior read command from the start LBA of the current read command that has just been received. The result of that calculation is the DLBA for the current read command. This DLBA is then stored in the search sequence stack to generate a new search sequence and is also stored in the read command history database (at 606, 608).

In different embodiments, the search sequence entries and the read command history database entries may include just the DLBA, the DLBA and length information received from the read command, or the DLBA and the length and start LBA information received from the read command. After generating the search sequence stack and updating the read command history, the controller may then search for occurrences of the search sequence in the read command history in much the same manner as in FIG. 5, but this time based on the DLBA information (at 610). If no match is found (at 612), then the pre-fetch process based on the current DLBA is skipped (at 620) or alternatively some other predetermined pre-fetch location is used, such as a predetermined offset from the current read command storage LBA address, for a pre-fetch operation.

If a match is found (at 612), then the DLBA value in the next entry of the read command history database following the matched search sequence is retrieved (at 614) and converted back into a start LBA address (at 616). The conversion of the retrieved DLBA back into a start LBA format may be accomplished by retrieving the current read command start LBA and adding the DLBA value to it. The current read command start LBA may be retrieved from the start LBA buffer noted above, or from the search sequence queue entry or read command history entry for the current read command in embodiments where one of those entries is also configured to store the start LBA. Once the retrieved DLBA is converted to a start LBA of a predicted group of read data, the controller may execute a pre-fetch operation of data at that predicted start LBA (at 618).

For both the start LBA embodiment of FIG. 5 and the DLBA embodiment of FIG. 6, the execution of the pre-fetch operation may include using the start LBA retrieved (or calculated from the DLBA retrieved) from the read command history database entry identified as the predicted next read command and determining a physical address in non-volatile memory, for example from a logical-to-physical mapping table that is stored in volatile memory (RAM 116) and/or non-volatile memory 104 in the memory device 100. An amount of data retrieved from that physical address location may be a default amount or the amount identified by any length information that is stored in the read command history database entry. The pre-fetch operation is executed prior to receiving the next read command and the data may be retrieved in parallel with the data for the current read command or during a next available idle time of the memory device. The pre-fetched data may be stored in any memory region of the memory device, for example in RAM, and provided to the host if the actual next read command received is for that data.

The manner in which the search sequence having DLBA entries is used to parse the read command database with DLBA entries may be the same as in the start LBA bodiment of FIG. 5. The search may start from the most recent commands backward in read command sequence, from the oldest command forward in read command sequence, or starting from any other point in the read command database. What constitutes a match of the search sequence in the read command database may also be the same in either of the start LBA or DLBA implementations. For example, in the DLBA implementation, a match may be a match of all of the DLBA search sequence entries to a consecutive sequence of prior read command database entries. In implementations where length of the read command is stored with the DLBA in each search sequence and read command data base entry, then the match may be required to include the same the length and DLBA values in each paired entry of the compared search sequence and read command database entries.

Figure 7A:
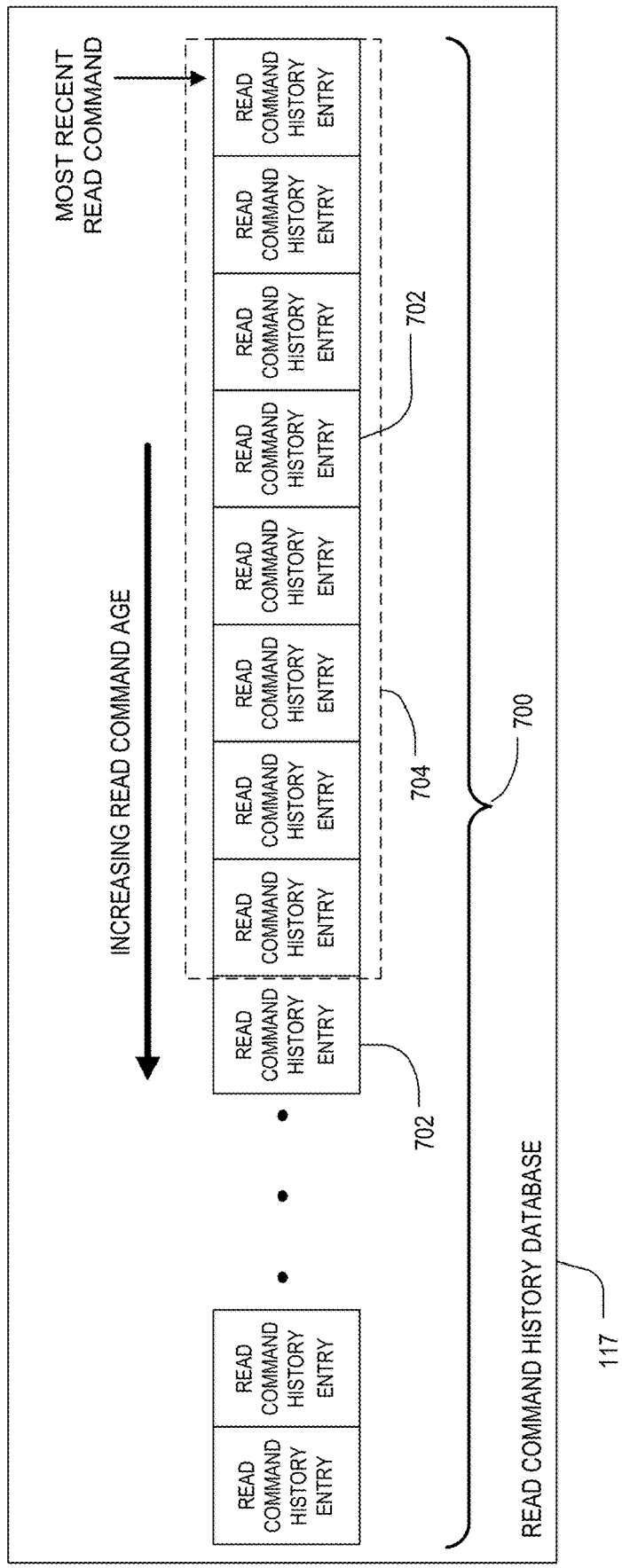
FIG. 7A is a block diagram of a command sequence search in a read command history database for use in the methods of FIG. 5 or 6.
Figure 7B:
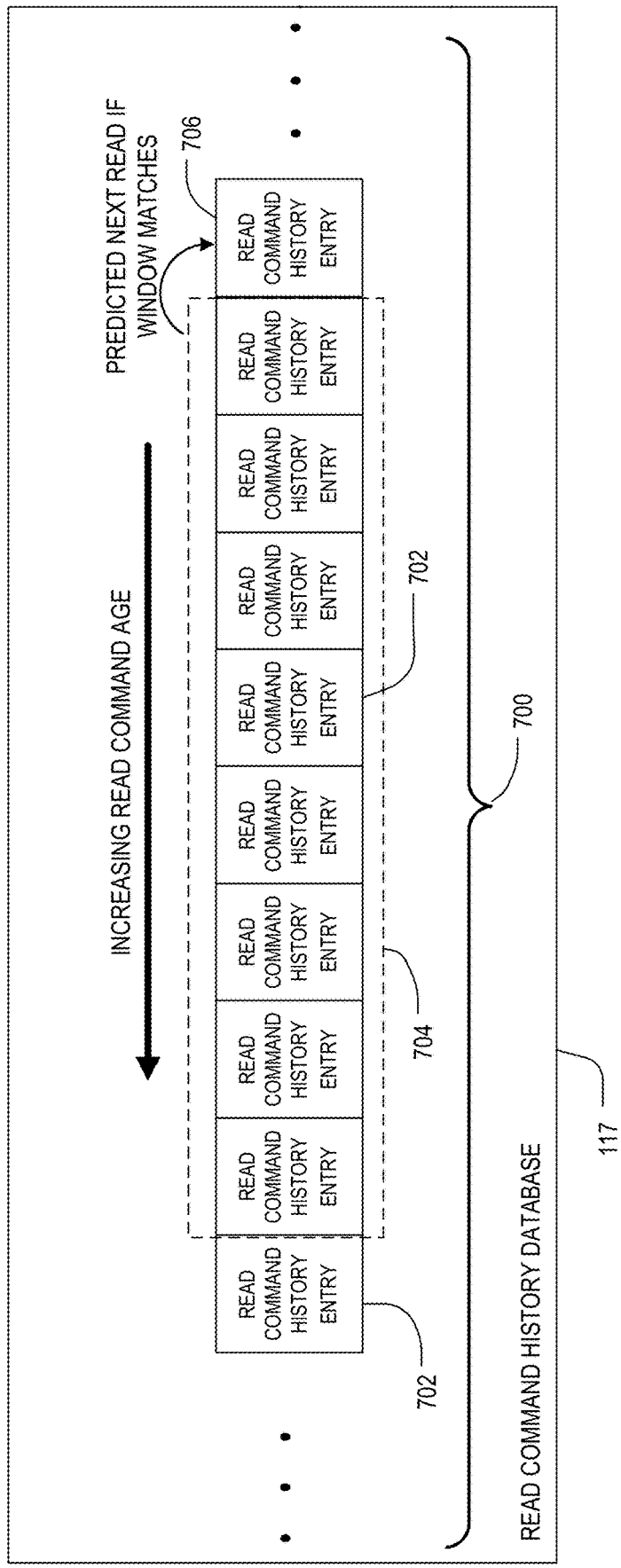
FIG. 7B is a block diagram of the command sequence search of FIG. 7A representing a pattern match and the location of the predicted next read data to be retrieved relative to the match.

Referring to FIG. 7A, a graphical example of the controller parsing the read command history database 117 by comparing the entries of the search sequence buffer 121 to the entries of the read command history database is shown. The search sequence is represented in FIG. 7A as a search window 704 containing the time ordered last 8 (in this example) received read commands including the current read command, in chronological order by time of receipt by the controller. Starting with the most recent read command entries 702 in the continuous chronologically ordered linked list 700 of prior read command information in the read command history database 117, the controller compares this window 704 of the search sequence to 8 read command history database entries 702 at a time. The controller 102, via the random read pre-fetch module 112, searches by effectively sliding the search window 704 one entry 702 at a time looking for a match between the search sequence and the sequence entries covered by the search window 704. As illustrated in FIG. 7B, when the search sequence, represented by the search window 704, matches the current pattern of prior read command entries 702 being compared to the search window 704, the first read command entry after the matched prior read entry pattern (next most recent in time) is identified as the predicted next read command 706.

The start LBA and DLBA implementations of FIGS. 5-6 may conclude the search for matches after a first match is found, or may search for some fixed number of matches, or all matches, of the search sequence found in the read command history database 117. Additionally, if multiple matches are found having differing results for the predicted next start LBA or DLBA, then the start LBA or DLBA selected as the predicted next read command 706 may be the start LBA/DLBA from the most recent read command in the list 700 of prior read command information that matches search sequence. Alternatively, the start LBA or DLBA may be chosen from the predicted next read command 706 that occurs most frequently in the pattern matches that are found for that search sequence.

Figure 8:
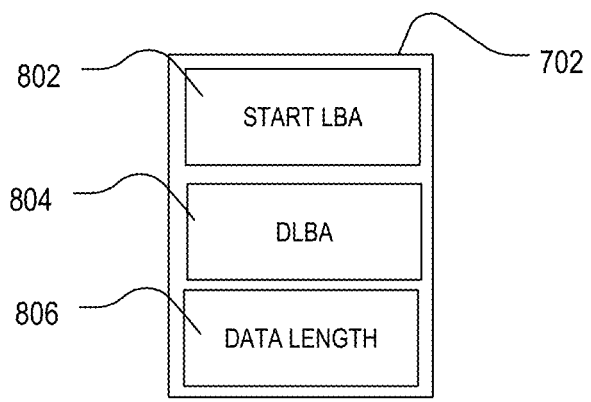
FIG. 8 is an example read command history database entry.

FIG. 8 shows an embodiment of a format for a read command history entry 702 that may be used in the read command history database 117. In the embodiment of FIG. 8, each entry 702 may represent the read command data location information for a single previously received read command. The entry 702 may include a start LBA field 802, a DLBA field 804 and a data length field 806. The start LBA may be the actual starting LBA address that was received with the prior command. The DLBA may be the differential, also referred to as delta LBA, calculated for the start LBA based on the difference between the start LBA of the command and the start LBA of the prior read command, The data length, also referred to as just "length", field 806 may be the address range length that was originally received with the start LBA in the read command. In alternative embodiments, other parameters relating to the read command could also, or alternatively, be saved in other fields with each read command history entry, such as other "metadata"-type of parameters, including error correction code (ECC) configurations and flash parameters or configurations.

The embodiment of FIG. 8 is just one of many contemplated variations of the format for a read command history entry 702. In different implementations, the entry 702 may include only the start LBA or only the DLBA, and may omit the length information for the read command. For example, rather than recording the length of the data that a particular read command includes, the prediction and pre-fetch technique may be simplified to matching search sequence and read command history data base entries based only on start LBA or DLBA. The pre-fetch operation then initiated by the controller may be of a default amount of data from the location of the predicted next read command 706 rather than using length of data information that was originally associated with the predicted read command, but not recorded in the entry 702. Alternatively, when the read command history entry 702 identified as the predicted next read command 706 includes the data length field 806, the controller 102 may retrieve the specific amount of data at the location of the start LBA or DLBA also in that identified read command history entry 702.

It should be noted that the search to find a match between the search sequence and a sequence of read history command entries in the read history command dataset (at 508 in FIG. 5 or at 610 in FIG. 6) may be based on matching only the start LBA fields or DLBA fields, respectively. In other embodiments, more than one field for each search sequence entry and each read command history entry may be required to match, such as start LBA (or DLBA) and length fields in each command. Also, a match is considered to be a 100% match of the fields being compared in the search sequence and the read command history entries. In alternative embodiments, it is contemplated that a fixed amount of matches between the search sequence and the read command history entries less than 100% may be considered a match for purposes of identifying a predicted next read command.

The embodiments discussed above address ways of predicting next read commands where a pattern of read commands is searched for from a comparison of a search sequence to a relatively large and continuous time-ordered database of read command address history. In certain implementations, the memory device may have a limited amount of memory in which to store prior read command history, or may have other constraints that require less processing time or faster pattern matching capabilities than the embodiments of FIGS. 5-6 may be able to provide, as these previous embodiments are based on relatively long search operation for each pattern matching occasion. Having a smaller amount of read command history data may result in somewhat less accurate read command prediction capability, however that may be an acceptable tradeoff for lowering the amount storage space needed for the read prediction process and increasing the speed (decreasing the latency) of the pattern matching operation. As discussed in greater detail below, any of a number of algorithms, such as a hash-based algorithm, may be implemented to reduce the size of or access time to the history pattern matching information.

Figure 9:
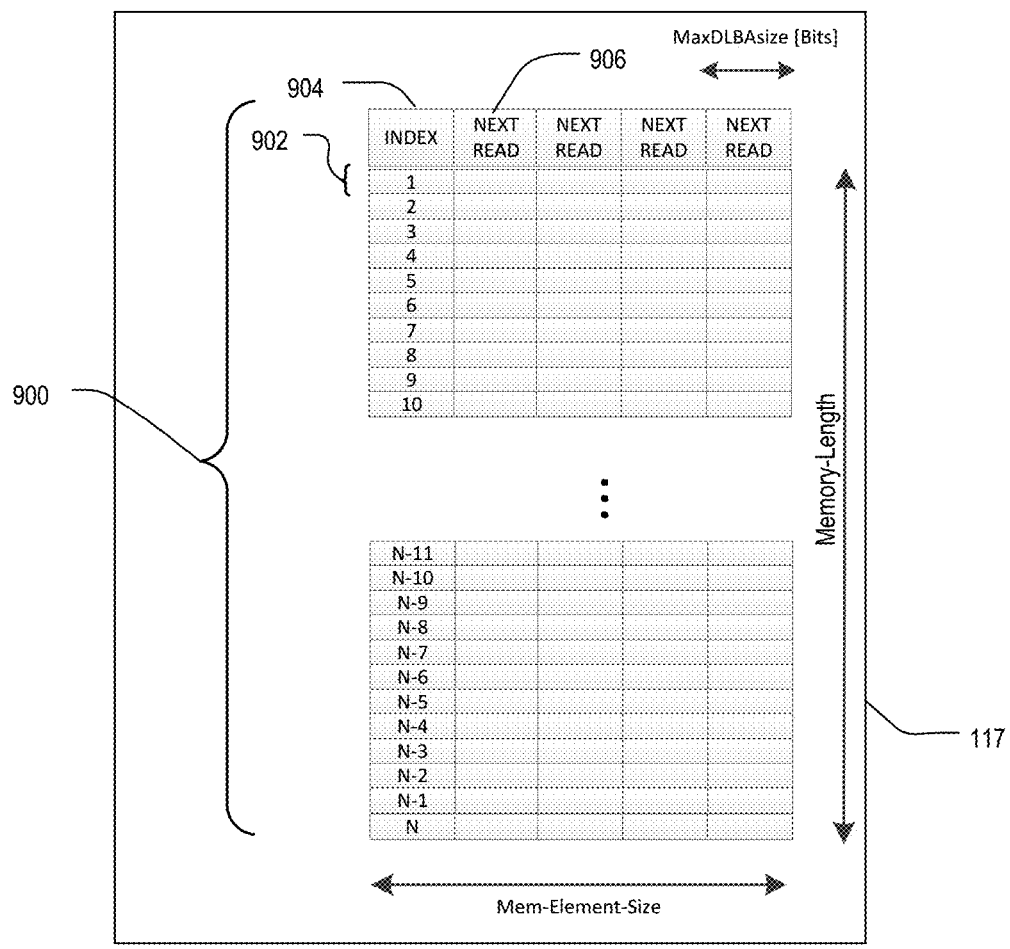
FIG. 9 is an example of a read history pattern match database having a finite number of hash-indexed entries.

As shown in FIGS. 9-13, systems and methods are provided to reduce the read command history database of sequentially ordered prior read commands to a history pattern matching data structure of potentially smaller size and faster pattern matching capabilities. Referring to FIG. 9, instead of a datastore that is the read command history database 117 containing a continuous time-ordered history of read command information in a list 700 such as shown in FIG. 7A, a smaller history pattern match data structure may be stored and maintained in read command history database 117. The history pattern match data structure may be a history pattern matching (HPM) table 900 of fixed memory length of M table entries, where each table entry 902 is identified by a unique index number 904 (1-M) and includes a memory element (sometimes referred to herein as a memory location) 906 for holding a predicted next read entry. The unique index number 904 represents a many-to-one conversion of the full search sequence of recent read commands, for example a many-to-one mapping of the 8 entry search sequence described with respect to FIGS. 5-6. The predicted next read command entry in a memory element 906 may be a DLBA for a read command that last followed the search sequence corresponding to index number 904. In addition, in some implementations the length of the predicted next command may also be included with the start LBA or DLBA.

It should be noted that, in other embodiments, the read command history database 117 used for storing data on prior read commands, whether in the form of a list 700, an HPM table 900, or other format, may include more than just prior read command entries. For example the read command database 117 may include entries for other types of commands, such as write commands, flush commands and/or other commands, and not only read commands. In such embodiments where more than one command type is present in the database 117, the search sequence (pattern of prior commands) may also include several command type identifier bits to identify the command types being searched for among the multiple types of commands in the database. This command type identifier may be included in addition to the start LBA, DLBA or data length information so that a match of both command type and the one or more other data types may be searched for. The search sequence, used with either the list 700 or HPM table 900 versions, may then include the sequence prior commands of any type stored in the database 117 that preceded a read command.

Figure 10:
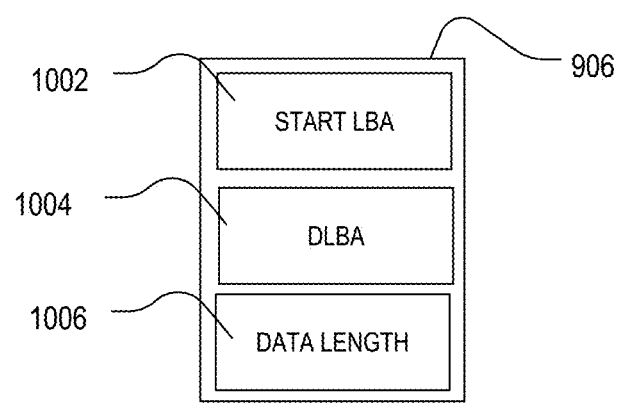
FIG. 10 is an example read history pattern match table entry for use in the table of FIG. 9.

Referring to FIG. 10, the format of a memory element 906 in a table entry 902 may be the same as that for the linear list 700 in FIG. 7. Specifically, each next read command entry stored in a memory element 906 may have only one or both of the start LBA 1002 or the DLBA 1004 of a read command that was previously received after the search sequence that led to the index value 904 for that table entry. Additionally, the memory element 906 may include the read command length information 1006 and/or fields for any other parameter related to the read command. One example of another parameter related to the read command that maybe stored in the memory element as part of a next read command entry is a time difference between when the read command identified in the memory element 906 and the last read command received prior to that read command.

In order to use the history pattern matching data structure, also referred to herein as a prior read command data structure, such as the history pattern matching (HPM) table 900 of FIG. 9, the random read pre-fetch module 112 of the controller 102 uses a many-to-one conversion technique on the search sequence generated in the search sequence buffer 121 after each read command is received. Any of a number of many-to-one mapping functions adapted to take a large number of potential combinations and map them to a smaller fixed number of entries and having an order 1 (also referred to as O(1)) access-time complexity may be used. As used herein, the term O(1) refers to an algorithm that will always execute in the same time (or space) regardless of the size of the input data set.

In one implementation, a hash function combined with a modulo operation may be used by the controller 102 as the O(1) complexity operation. The hash function and modulo operation provide a O(1) complexity calculation that can reduce all of the possible different search sequence combinations of search sequence length L (where L equals the number of read commands in the search sequence) and map them to a smaller, predetermined range of index numbers 904. It should be noted that the search sequence refers to a pattern of read commands, where the pattern of read commands may be described as a specific sequence of read commands over a period of time, hence the terms pattern and sequence may be used interchangeably herein. The hash and modulus (also referred to as modulo) functions may be selected such that the index numbers 904 generated as an output of these functions is limited to the fixed size (memory length M) HPM table 900 of FIG. 9. Thus, the modulus operation may be X MOD M, where X is the output of the hashed search sequence and M is the number of table entries supported. The modulus function would take the hash output, divide that output by M (memory length of HPM table in RAM) and return an integer remainder that would fall in the range of 0 to M−1, for a total of M possible index values. By limiting the potential index values to a predetermined range, the many-to-one algorithm provides a way of assigning each search sequence only one index value, but where each index value may apply to more than one different search sequence. A simplified example of the next data read prediction steps using a many-to-one mapping and the resulting HPM table 900 is shown in FIG. 11.

Figure 11:
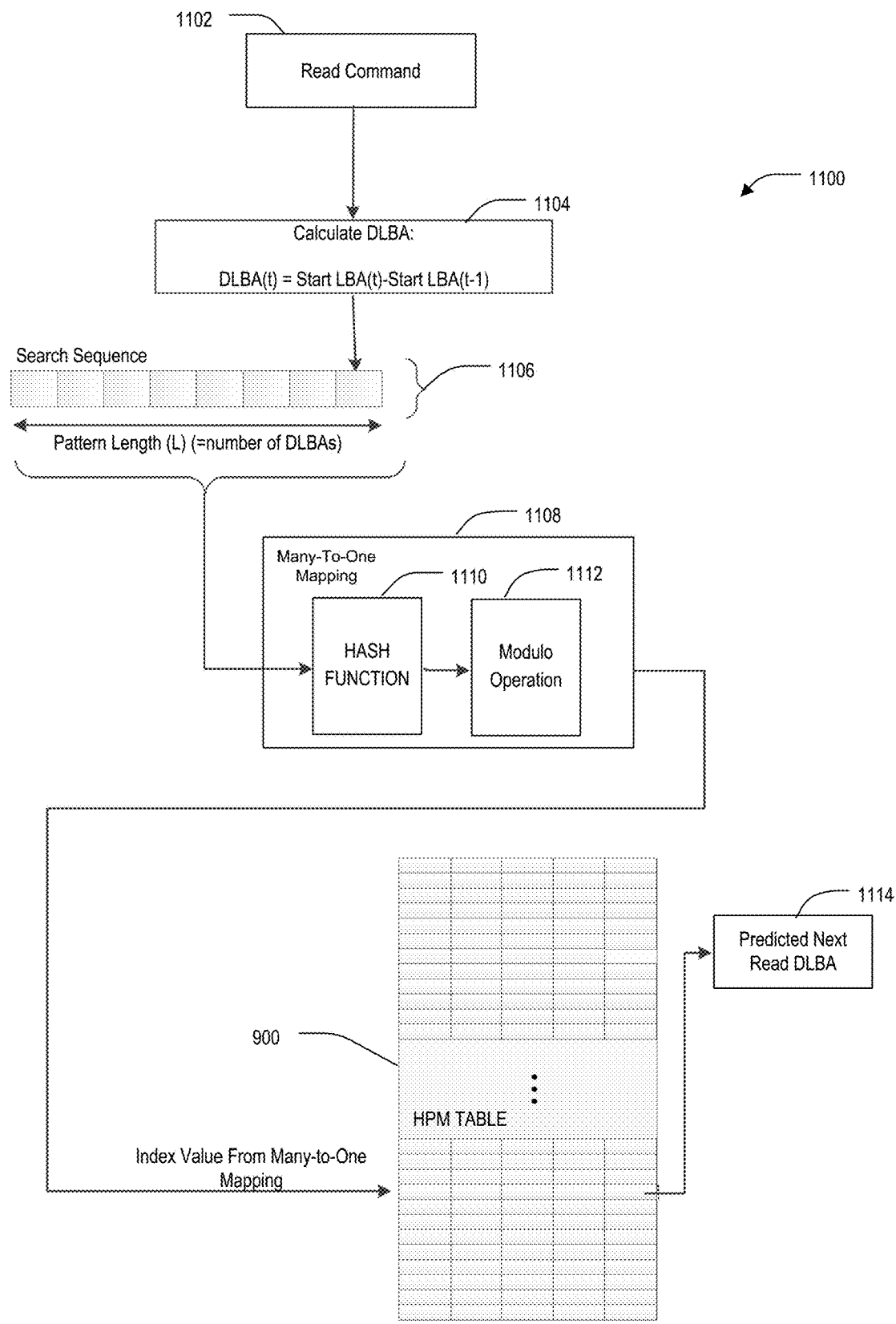
FIG. 11 is a flow diagram 1100 illustrating a process for predicting a pre-fetching random read pattern data using a many-to-one indexing process.

As illustrated in FIG. 11, when the memory device 100 receives a read command (at 1102), the controller 102 may convert the start LBA data for that read command to a DLBA (at 1104) and use the DLBA to generate a new search sequence of recent DLBAs (at 1106) and then save the that search sequence in the search sequence buffer 121. As previously noted, the conversion to and from start LBA to DLBA is one way in which to form the search sequences, but it is optional and start LBA only may be used for the search sequence in other implementations.

With this index value that the controller 102 has generated from the search sequence, the controller may then go to the HPM table 900 and retrieve a DLBA value from the HPM table associated with that index value as the predicted next read (at 1114). In one implementation, the HPM table 900 only includes a single memory element 906 for a single next read command entry associated with each index value 904. Thus, the single next read command entry in the memory element 906 may be selected and, if in the form of a DLBA, converted to a start LBA for pre-fetching the data identified. In other implementations, the HPM table 900 may be sized to include several memory elements 906 per index value 904 and the memory element 906 selected as containing the predicted next read information may be the most recently written of the memory elements. Alternatively, the memory element 906 selected for the predicted next read may be the one containing the most frequent of the occurring DLBA value in the memory elements for the indexed table entry 902. In yet other implementations where each table entry 902 includes multiple memory elements 906, the controller may only store each different predicted next value having the same index value only one time and include counter or histogram information with the value that tallies the number of occurrences of that value has been stored. This may provide a way of only writing a value one time per table entry 902 and thus allowing the memory elements 906 in a table entry 902 to hold other values. The options for selection of the predicted next read from that indexed table entry 902 may then be based on selecting the memory element 906 containing the next read entry associated with the highest frequency counter/histogram value.

Assuming that the memory elements 906 of the HPM table only store a DLBA value for a next read prediction, the controller 102 may then convert the DLBA to a start LBA by adding the DLBA value to the start LBA value of the current read command and then proceed to retrieve the predicted next read command data prior to receiving any next read command as discussed above.

Referring to FIG. 11, one embodiment of a process 1100 of predicting a next read using a many-to-one mapping of search sequences is shown. A read command is received and the read command start LBA data converted to a DLBA value (at 1102, 1104). The DLBA value, as discussed above, may be generated by subtracting the start LBA value of the prior read command from the start LBA value in the received read command. The new DLBA value is used to generate a new search sequence (at 1106) of predetermined pattern length (L) by inserting the new DLBA into the prior search sequence and removing the oldest. DLBA read command DLBA from the prior sequence. In this embodiment, L is shown as 8 total read commands. The search sequence (at 1106) may be stored in the search sequence buffer 121 as described previously.

The controller 102 then passes the search sequence through a many-to-one mapping operation (at 1108) that may include a hash function (at 1110), followed by a modulo operation (at 1112) to make sure the hash value stays within the predetermined index value range supported by the HPM data structure. The controller 102 may utilize any of a number of hash functions, for example Bernstein's hash function djb2, Kernighan and Ritchie's hash function, NDBM, SDBM, SHA-1 (Merkle-Damgard construction), Zobrist hashing (variable XOR) and so on. The controller may treat the search sequence as a string or as a number according to the Hash algorithm used. As one simplified example, where the search sequence is a time ordered sequence of 4 start LBAs for the current read command and the 3 last read commands prior, and the numbers were 210, 350, 600 and 7000, the string used as input for the hash function may be the concatenation of the search sequence numbers: 2103506007000.

The many-to-one mapping routine 1108 may be executed by the controller 102 via the random read pre-fetch module 112. Once the index value is determined from the hash process, the index value is used to identify the entry in the HPM table 900, as described previously, and the next read prediction is selected from the identified index entry in the table 900. In one implementation, when the HPM table includes multiple memory elements 906 in a table entry 902, the most recent DLBA information of the memory elements 906 in the table entry 902 identified by the index value is selected as the predicted next read.

Figure 12:
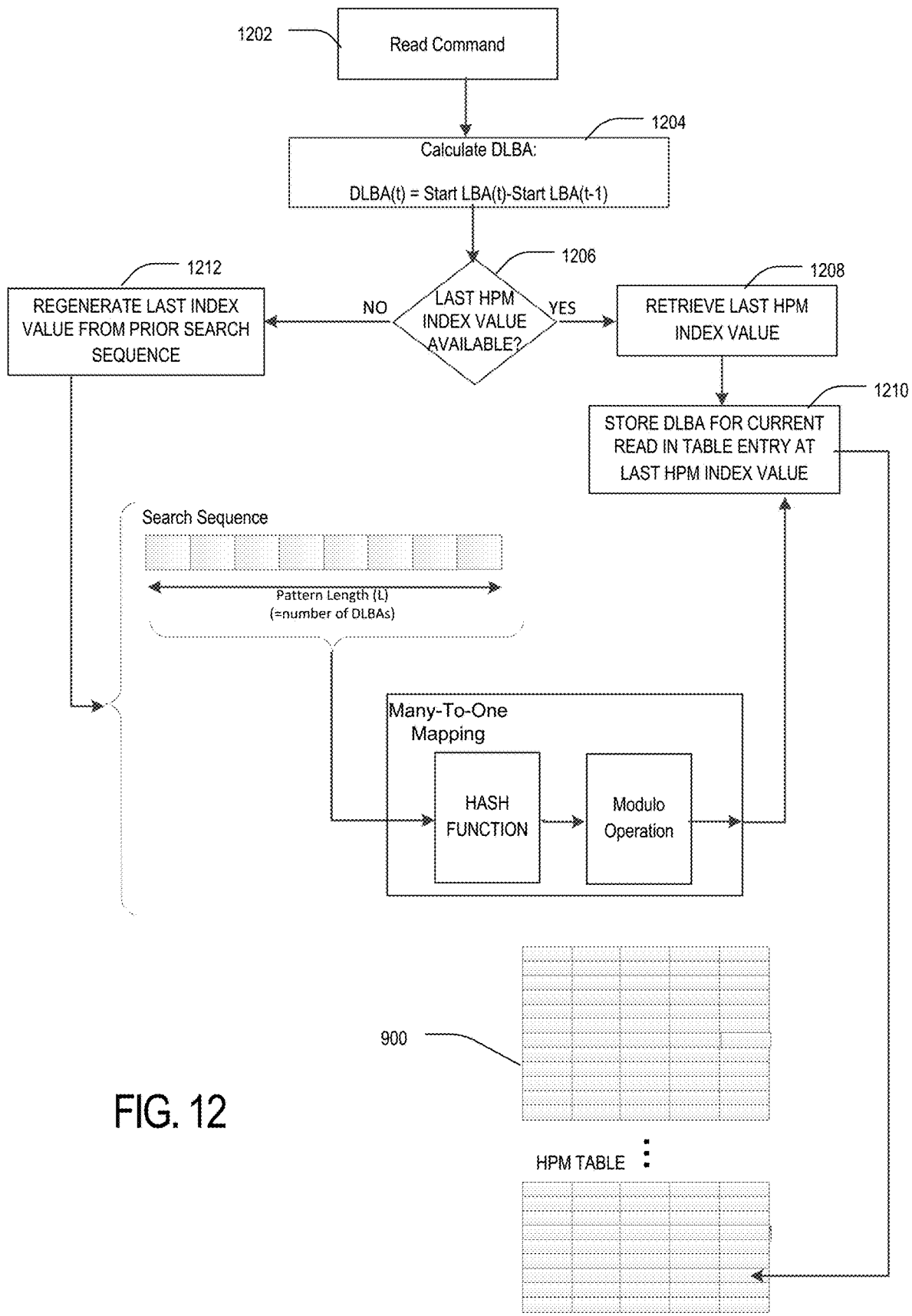
FIG. 12 is a flow diagram illustrating a process for updating a read history pattern match data structure using a many-to-one indexing process.

As illustrated in FIG. 12, a method of updating a read command history database 117 is illustrated for an HPM table 900 version of predicting read commands. For an update of the read command history database 117 on the memory device 100, when the read command history is tracked in a sequential list 700 of all prior read commands, the update may be as simple as adding in the current read command information (start LBA and/or DLBA and other read command parameters) as another entry to that list. In one implementation, the list 700 is simply adjusted in a "shift left" operation through to the oldest of the read command history entries 702 and the newest read command added to the right side of the list 700 (assuming, without loss of generality, that the newest is on the right side). The concept of shifting older entries toward one end of the list and adding in a new entry on the opposite end may apply to any direction the list may be oriented. In that way, the arrival order of the commands at the controller is tracked according to its entry location in the list.

Unlike the sequential list 700 of read commands, the HPM table 900 updates need to include the intermediate step of mapping the currently received read command to an indexed search sequence of read prior read commands. Thus, as illustrated in FIG. 12, when the new read command is received, the last generated search sequence may be used to regenerate the index value of where the current read command is to be added to the HPM table 900. Alternatively, if the index value for the last search sequence (used to predict the read command and pre-fetch data for the command that has now been received) is still stored in the controller memory, that index value may be used by the controller 102 to store the actual read command information in a memory element of the table entry 902 having that index value.

As is evident from the prediction and update procedures for using a many-to-one mapping of prior read commands, where a data structure such as a HPM table 900 are used, a preferred order of activity is to first update the HPM table 900 and then proceed with the prediction of the next read command. This allows potential reuse of the last calculated index value for the pattern of prior reads used to predict the current read, or use of the search sequence still residing in the search sequence buffer 121 for those prior reads. Momentarily delaying generating the search sequence update, and new HPM table index calculation from the newly generated search sequence, until after the HPM table 900 is updated with the received read command permits the prior index calculation or prior search sequence to be used. Otherwise, a separate buffer is necessary for the last search sequence and/or last index calculation.

In other implementations, the HPM table 900 update may not occur prior to the prediction and instead only take place when the memory device is otherwise idle (e.g., at times when no host command is pending), so that there is no delay in executing the next read prediction process. In this alternative embodiment, read command information for several read commands may be accumulated, and then the HPM table 900 may be updated at a later time, such as when the memory device has some idle time where there are no pending host commands.

As illustrated in FIG. 12, an update process 1200 is shown for embodiments using the HPM table 900. For each read command that arrives (at 1202) at the memory device 100, the HPM table 900 is updated prior to the read prediction operation. The start LBA for the most recent read command is converted to DLBA format (at 1204) and is used to update the HPM table 900.

The last search sequence received and converted via the many-to-one conversion process, such as hashing and performing a modulo operation, may be used to locate the correct index location that the DLBA information for the current read command is to be written to.

Any number of techniques for retrieving or generating the prior indexed search sequence for use in updating the HPM table may be utilized. For example, the hashed index value for the prior search sequence may be retained in short term memory at the controller 102 and used to store the current read command DLBA in the indexed past search sequence location. Accordingly, if the last HPM index value is still available in controller memory or elsewhere in the memory device (at 1206), it is retrieved (at 1208). The controller 102 then uses the retrieved last HPM index value to select the correct table entry 902 in the HPM table 900 and to store the DLBA for the current read command in a memory element 906 for that indexed table entry 902 (at 1210). Alternatively, when the last HPM index value is not available (at 1206), the controller may regenerate the last HPM index value from the prior search sequence (at 1212). The search sequence from the last read command prediction operation may be retrieved from the search sequence buffer 121 before updating it with the DLBA of the current read command (as will occur when the read predict process of FIG. 11 moves forward, and the index value recalculated with the same many-to-one mapping procedure of hashing and then applying a modulus operation as discussed with respect to FIG. 11. Using the search sequence from the last prediction that is still stored in the search sequence buffer 121 and recalculating the index number, the DLBA information for the current command may be stored in the correct table entry 902 with the recalculated last HPM index value for the prior search sequence (at 1210).

In one implementation, where there are unused memory elements available in the table entry 902 of HPM table 900 for that index value 904, the DLBA for the current read command is simply stored in the open memory element 906, regardless of whether or not it is the same value as another DLBA value stored in a different memory element 906 at that index value 904. In other implementations, with more than one memory element per table entry, a value may only be written once and any repeat of writing that same value will trigger a counter or tag being added, or a histogram value generated, that tracks the number of times the value occurred. In this manner, other memory elements 906 in the table entry 902 may be freed up rather than writing the same value to multiple memory elements of that table entry. Also, when using the most frequently occurring value as the selected next read prediction, the controller can simply look at the counter rather than counting occurrences each time.

When more than one memory element 906 is associated with each table entry 902 and all of the memory elements are full, a "shift left" type of insertion and deletion of next read command entry data from the data elements may be used when new read command data is to be written to that table entry 902. For example the last (oldest) value of read command data may be shifted out on the left side, the newer values previously written to the table entry are shifted to the left by one memory element, and the new value inserted at the right most memory element of that table entry 902. The specific "shift left" discussion above is simply one example of a time-order update. Any of a number of arrangements are contemplated where a time-order is being kept (such that the "oldest" command could be dropped in order to make room for the newer command, or in order to prioritize the newer command) when producing the predicted next read command. In another implementation, where only a single memory element 906 is included for each table entry 902 in the HPM table 900, a new read command data value will overwrite the old value. In yet other implementations, when all of the one or more available DLBA memory locations for the particular index value have been written to previously, the new value may be discarded and the memory element kept fixed with the prior written DLBA information such that no updating of the HPM table 900 after an initial DLBA write has been made to memory elements.

As is to be expected when a many-to-one mapping technique is used on a large set of variations of data combinations (here a large number of potential combinations of search sequences converted to a smaller set of available index locations), there will be times when the different search sequences yield the same hashed index value. For example, if the potential number of search sequence combinations was 1000 and the hash algorithm is configured to only output numbers from 1 to 100, there could be, on average, 10 different combinations mapped to the same HPM table entry (assuming a perfect distribution of mappings among index values). To allow for different next read command results for the same index value in the HPM table, the number of memory elements in the HPM table may be more than one so that different results may be recorded in the HPM table at different memory elements in the same table entry 902.

Similar techniques for selecting the predicted next read from among the multiple memory elements 906 at the same indexed table entry 902 may be used as were discussed with reference to FIGS. 5-6. In one implementation, the value returned from the HPM table 900 after determining an index value 904 from a current search sequence may be the last (most recent in time) memory element 906 written to for the corresponding table entry 902. Alternatively, the predicted next read data may be selected based on which predicted next read data value appears the most times in the memory elements 906 of that table entry 902.

Figure 13:
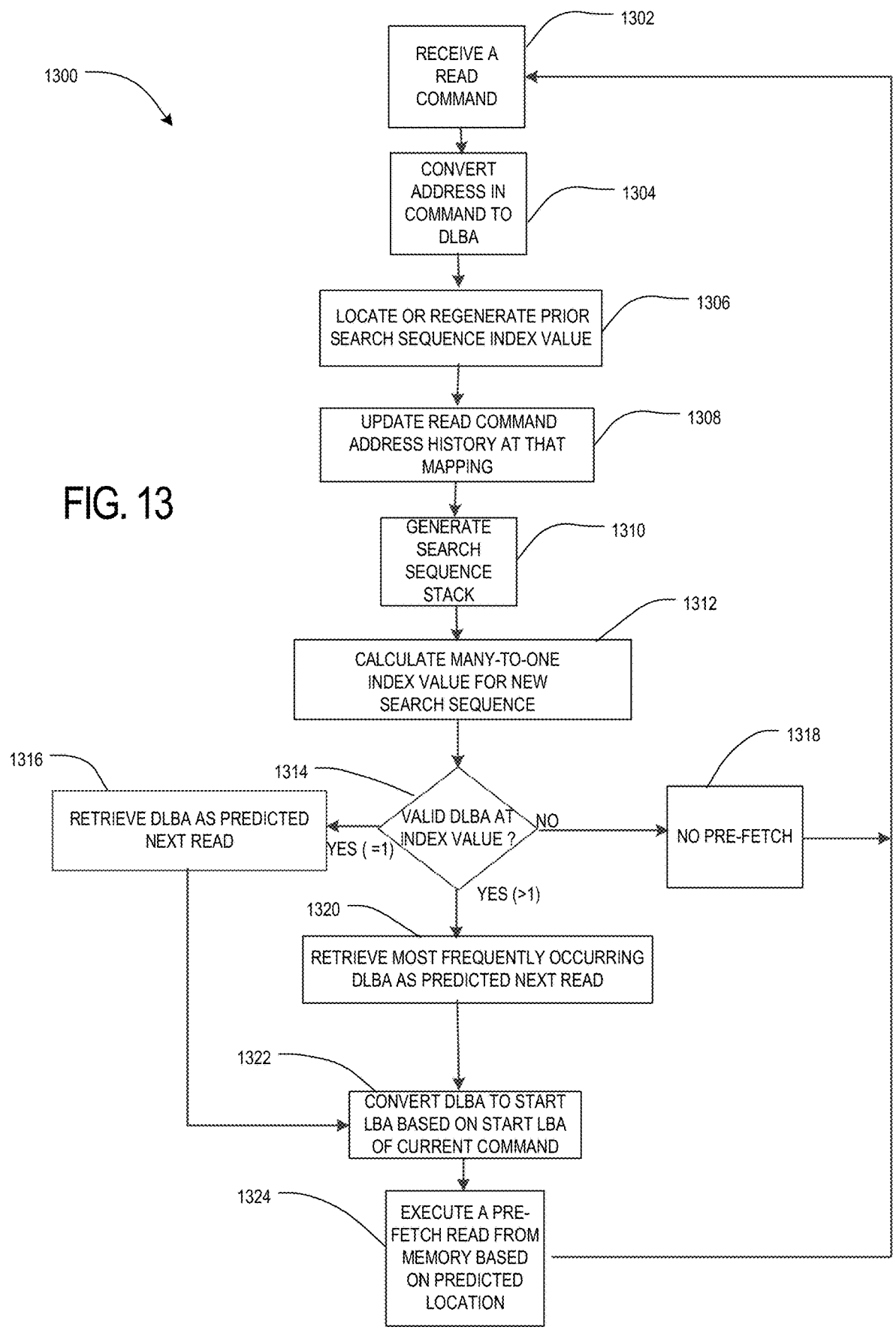
FIG. 13 is a flow diagram 1300 of the combined read prediction and update procedures for a many-to-one indexed history pattern matching table of FIGS. 11-12.

One version of the combined processes of predicting a next read command for pre-fetching data (FIG. 11) and of updating the read command history database when using an HPM Table 900 (FIG. 12) are summarized in FIG. 13. A read command is received at the memory device 100 (at 1302). The start LBA for the read command may then be converted to a DLBA value as described in FIGS. 11-12 (at 1304). Also, the index value of the search sequence generated prior to receiving the current read command is retrieved or regenerated from the search sequence values already stored in the search sequence buffer prior to receiving the current read command (at 1306). Using the retrieved index value, or the regenerated index value, the controller may update the HPM table by writing the current read command DLBA to the HPM table entry 902 identified by the index value (at 1308).

After updating the HPM table 900, the controller 102 generates a new search sequence in the search sequence buffer 121 by adding the new DLBA value and removing the oldest read command DLBA value to the search sequence (at 1310). In this manner, the search sequence pattern length (e.g., the number of read command DLBAs) is maintained at a fixed predetermined size. The controller 102 then applies the many-to-one mapping algorithm, in this example a hash function and modulo operation, to the newly generated search sequence to determine a new index value (at 1312). The controller then looks for any valid DLBA data at the memory element 906 or memory elements of the table entry 902 associated with the index value. If there is no valid DLBA to be found at that table entry 902, then the pre-fetch process may be skipped or some other default pre-fetch location may be used to pre-fetch data for a predicted next read (at 1314, 1318).

If only a single valid DLBA is found at the table entry 902 for the resulting index value 904 (at 1314, 1316), then that DLBA becomes the predicted next read. If more than one valid DLBA is found at the table entry 902, then any of a number of selection algorithms may be implemented (at 1320). For example, the DLBA that appears most frequently in the table entry 902 may be selected as the predicted next read (at 1320) or, in another implementation, the most recent DLBA stored at the indexed table entry 902 may be selected. The DLBA information for the selected predicted next read is then converted to a start LBA by adding the DLBA value to the start LBA of the current read command (at 1322). Once the start LBA is determined, a default amount of data starting at the start LBA, or the data length information (if any) stored in the table with the predicted next read DLBA, may be used to search the logical-to-physical mapping table in the memory device to execute a pre-fetch operation for the identified data (at 1324). With the obtained physical addresses associated with the amount of data identified by the start logical address and length information, the controller may then retrieve the data from non-volatile memory at those addresses before receiving the next read command.

It should be noted that FIG. 13 illustrates one possible way of combining the prediction and update processes of FIGS. 11-12. In other embodiments, the update process does not need to happen before the prediction process. Also, the prediction process of FIG. 11 is not necessarily triggered upon arrival of a new command, but may instead be delayed after receipt of a read command until the controller 102, based on other controller operating parameters, decides to trigger the prediction/pre-fetch process. For example, in certain memory device configurations, a controller operating system may need to adhere to strict power consumption requirements and may delay triggering of a prediction/pre-fetch process, or the update process of the read command history database, until after the power consumption parameters of its operating system allow it to do so.

The embodiment of FIGS. 11-13 includes conversions to and from DLBA values of the start LBA received in the next read command and of the retrieved DLBA of the predicted next read, respectively. In other implementations, the start LBA may be used to generate the search sequence that may be hashed, and HPM entries may include start LBA data rather than any DLBA data. Thus, the steps of converting start LBA to DLBA, and vice versa, may be skipped and start LBA used in other embodiments. Although the HPM table 900 and list 700 versions of the read command history database 117 are illustrated as stored in volatile memory, along with the search sequence buffer 121, they may be maintained in non-volatile memory in other embodiments. Also, these data structures may be automatically backed up into non-volatile memory when the memory device goes to sleep, or at memory device shut down, in other embodiments. Additionally, in different embodiments the data the received read commands are directed to, or where the data to be pre-fetched based on prior read commands is pre-fetched from, may be stored in volatile memory, non-volatile memory, or a combination of different types of memory.

As with the other versions above of predicting random reads and pre-fetching data at the locations predicted by prior patterns of read commands, if the actual next read command was correctly predicted, significant time savings and input/output performance may be improved. If the predicted next read command was incorrect, then the memory device simply retrieves the correct data for that command. It should be noted that the process of using a hash function or another many-to-one mapping routine and smaller lookup table may be based on a DLBA conversion of start LBA information in each read command, but may also be based on just indexing start LBA or other read command specific data.

The embodiments above have illustrated examples of single next read predictions and pre-fetch for random data read operations. Depending on memory device RAM or other buffer memory capabilities, and depending on the type of workload the memory device experiences, it may be advantageous to predict more than one next read command at a time and to pre-fetch data for that predicted series of read commands all at one time. This more opportunistic prediction of upcoming random read commands may be implemented in a number of ways.

Figure 14:
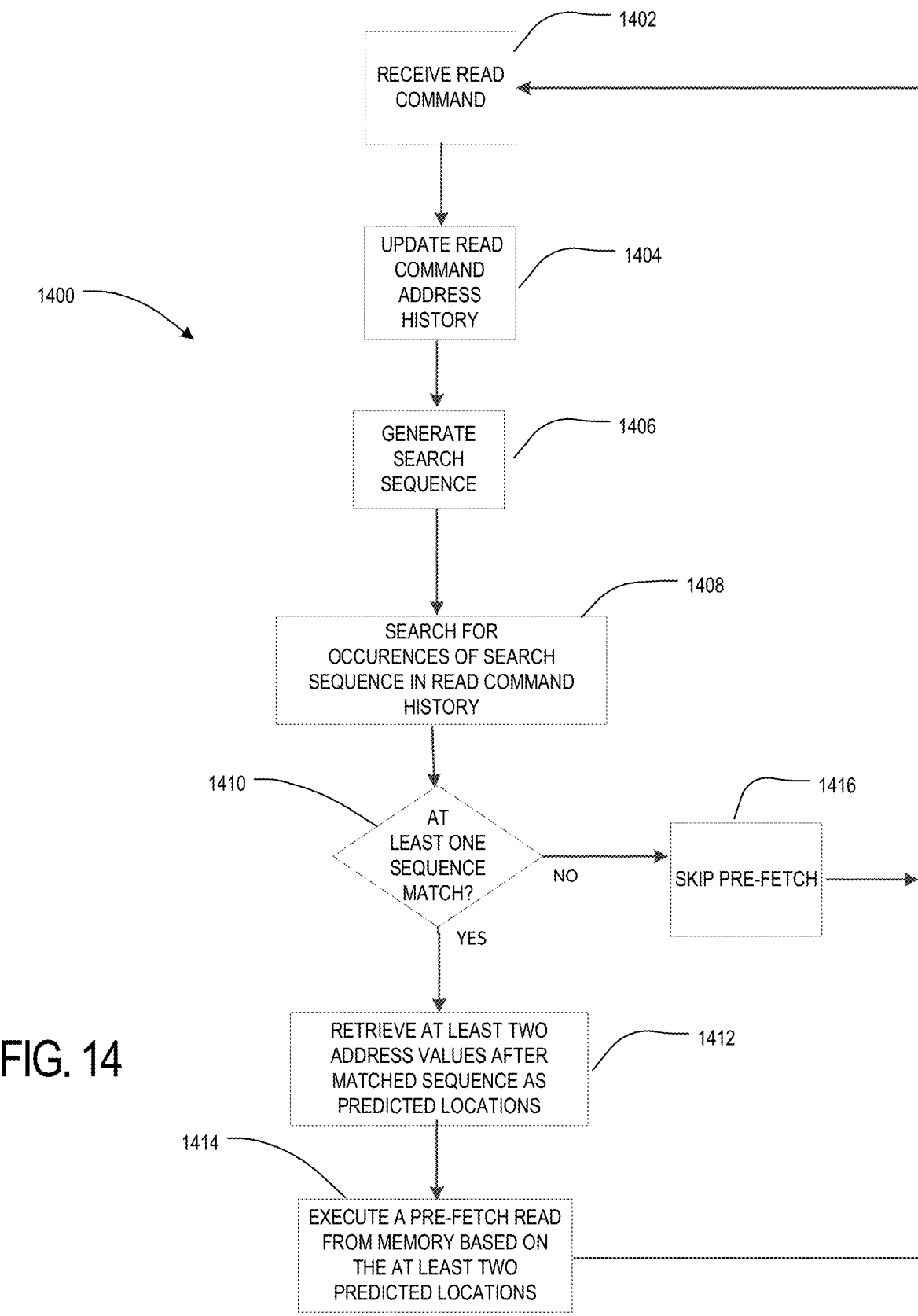
FIG. 14 is a flow diagram 1400 of an opportunistic read process for pre-fetching multiple predicted read commands at one time.

In a first implementation of a multiple read command prediction and multiple pre-fetch system and method, the continuous list 700 version of maintaining all prior read commands in the read command history database may be used. In this embodiment, as shown in FIG. 14, the process predicting and pre-fetching read data may share several similarities with the single read prediction and pre-fetch of data for the single predicted read of FIGS. 5 and 6. The memory device receives a read command (at 1402), and the continuous list 700 of prior read commands may be updated with the start LBA (and/or DLBA) and length information from the received read command (at 1404). Also, a new search sequence of a last predetermined number of read commands may be generated and stored in the search sequence buffer 121 (at 1406). Similarly, the search of the list 700 of sequential prior read commands in the read command history database 117 may proceed as described in FIGS. 5-6 (at 1408), where if no matches are found, the pre-fetch may be skipped (at 1410, 1416). However, with the multiple read command prediction and pre-fetch aspects of this embodiment, when a match is found, at least two next read command history entries immediately after (more recent in time than) the set of read command history entries that matched the search sequence are used as predicted next read commands and the data at those at least two next locations is pre-fetched (at 1412, 1414).

The at least two next predicted read commands that are retrieved may be a fixed higher number of next read commands in the list 700 version of the read command history database of FIGS. 7A and 7B or may be variable. In one implementation, if more than one match is found between the search sequence and the read command history database, and if more than two subsequent read command history entries after any two of the matched sequences match each other, than the number of retrieved addresses may be dynamically extended to the number of matching read command history entries 702 that follow each of the two matched sequences. Additionally, future read command predictions in this embodiment may be delayed until the number of read commands subsequently received after pre-fetching data for multiple read commands equals the number of read commands for which data was pre-fetched.

Figure 15:
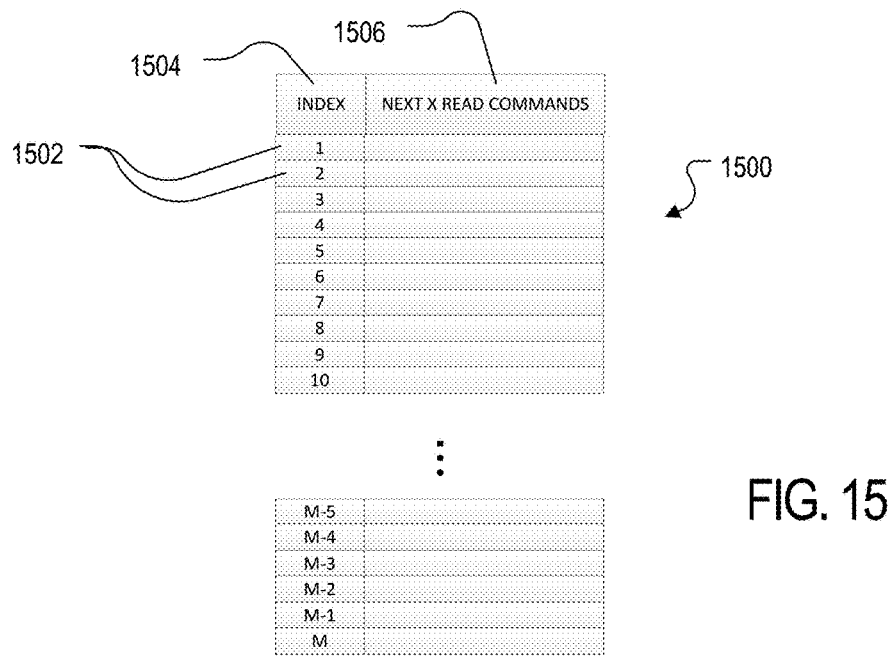
FIG. 15 illustrates an example read history pattern matcher table having multiple read command predictions per entry.
Figure 16:
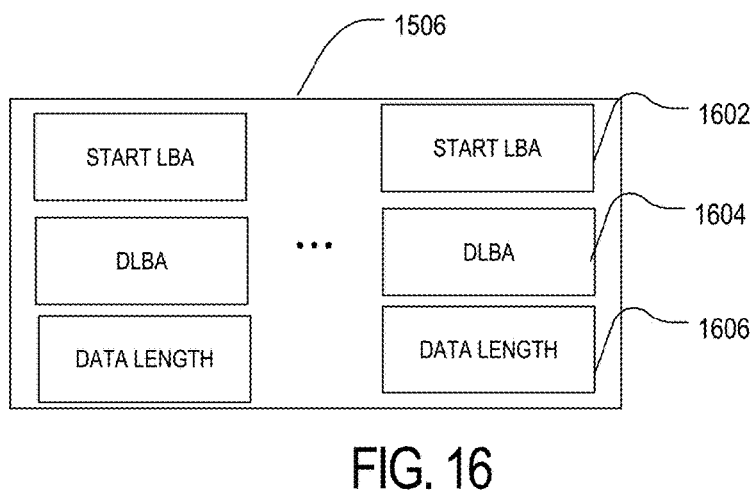
FIG. 16 illustrates a memory element format for the next read entries of the multiple read command prediction table of FIG. 15.

With respect to embodiments using the version of the read command history database 117 holding a hash table, such as the HPM table 900, different versions of the HPM table, and of the method for predicting read commands, are contemplated. As shown in FIG. 15, a multiple read prediction HPM table 1500 includes a limited number of M table entries 1502 indexed by an index value 1504 an including predicted read information 1506 at each table entry 1502. The same type of many-to-one conversion algorithm as described above may be used to generate the limited number of table entries 1502 in this version of the HPM table 1500. However, as shown in FIG. 16, unlike the single read command data in next read command entries of the HPM table 900 of FIG. 9, each memory element 1506 in the HPM table 1500 of FIG. 15 includes a predicted sequence of multiple prior read commands associated with a search sequence, where the read entries may include prior read command start LBAs 1602, DLBAs 1604 or length information 1606 organized in sequential sets that are retrieved, and the data for those predicted reads is pre-fetched.

Figure 17:
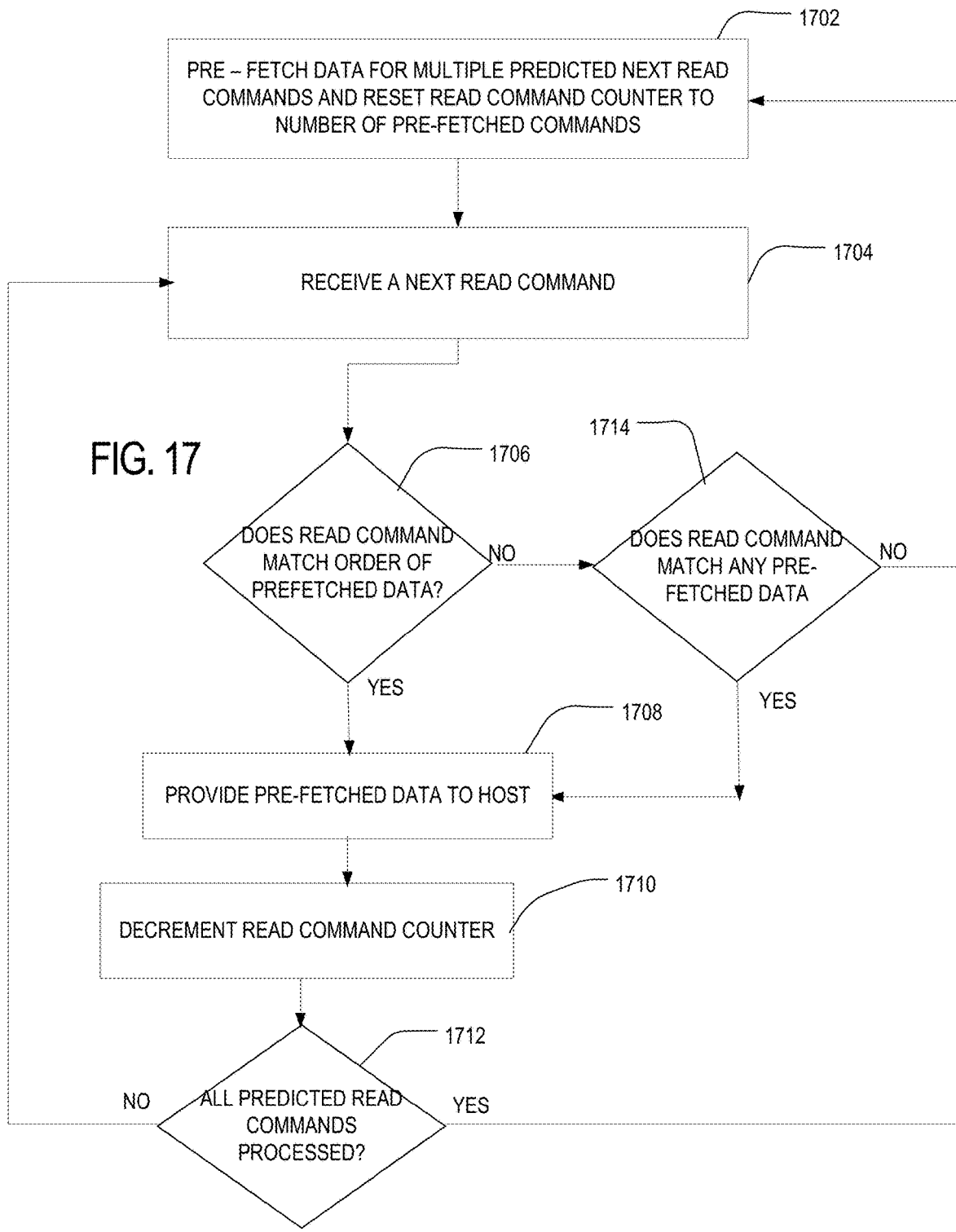
FIG. 17 is an embodiment of a multiple pre-fetch method.

In one implementation, as indicated in FIG. 17, the controller may implement a method of pre-fetching multiple predicted read commands at one time, hut then discard the multiple pre-fetched data when future reads do not match the predicted reads. For example, when data is pre-fetched for multiple predicted next reads, using the modified continuous list 700 matching technique or the modified HPM table 1500 technique discussed previously, a counter may be set by the controller equal to the number of predicted read commands that have been pre-fetched (at 1702). The counter may be stored in any available volatile memory, such as in internal register of the controller or RAM. When a next read command is received (at 1704), the controller checks first to see if the read command is directed to pre-fetched data content and order. If the received command matches the content and predicted read order, then the controller may provide the pre-fetched data to the host (at 1706, 1708). If the received read command doesn't match the pre-fetched data in the pre-fetched order, but is directed to some of the data that was pre-fetched, despite not being in the expected order (at 1714), then the controller may still provide the pre-fetched data to the host (at 1708). After providing the pre-fetched data to the host, the read command counter is decremented and, if the read counter value does not yet indicate that all the pre-fetched data for the current group of predicted reads has been processed, the process repeats and the next read command is looked for (at 1710, 1712, 1704).

Alternatively, if the received read command does not match any of the pre-fetched data, or all of the predicted read commands have been processed, then a new pre-fetch operation of data for multiple predicted read commands is performed (at 1714, 1712, 1702). The option of triggering a new pre-fetch when any one actual read command data request does not match any of the pre-fetched data may be modified to perform another pre-fetch only if two or more consecutive mismatches of pre-fetched and actual read commands are experienced. In yet another embodiment, the triggering of another multiple pre-fetch operation may automatically occur if the order of the actual read commands does not match the pre-fetched command order. In yet other implementations, the number of predicted read commands that are pre-fetched may be modified, increased or decreased, based on the number of correct pre-fetches, a percentage of correct pre-fetches in the most recent pre-fetch operation, or according to a current average of correct pre-fetches determined over a predetermined period of time. Other variations of changing the frequency of a multiple pre-fetch, or the amount of multiple read commands pre-fetched, in response to the success rate of the pre-fetched data matching the read requests that come in, are contemplated.

An aspect of predicting read commands and pre-fetching the data from non-volatile memory for those predicted commands is the power usage and efficiency. Predicting and pre-fetching data for read commands may provide for significant performance benefits when the predictions are correct, but may lead to higher power usage. This may be particularly true when multiple read commands are predicted and pre-fetched at the same time as discussed with respect to FIGS. 14-17. One method and system for avoiding at least some wasted pre-fetch operations and potentially improving on the success rate of pre-fetched data matching the actual later received read commands is applicable to the many-to-one mapping versions using hash tables discussed previously.

As already noted with respect to using a limited size hash table such as HPM tables 900 and 1500, the relatively fast look up time of predicted read commands using the hash function as compared to a potentially lengthy parsing of a list 700 of all read command history is an attractive feature. However, one tradeoff is that the limited size HPM table may lead to multiple search sequence patterns mapping to a same table entry 902 and the uncertainty of whether the predicted next read entry in a memory element 906 in that table entry 902 is for one search sequence or another. One mechanism for potentially increasing the likelihood of selecting the correct next read prediction from a table entry mapped to more than one search sequence is to add a second layer of read prediction identification in the form of a uniqueness calculation.

Figure 18:
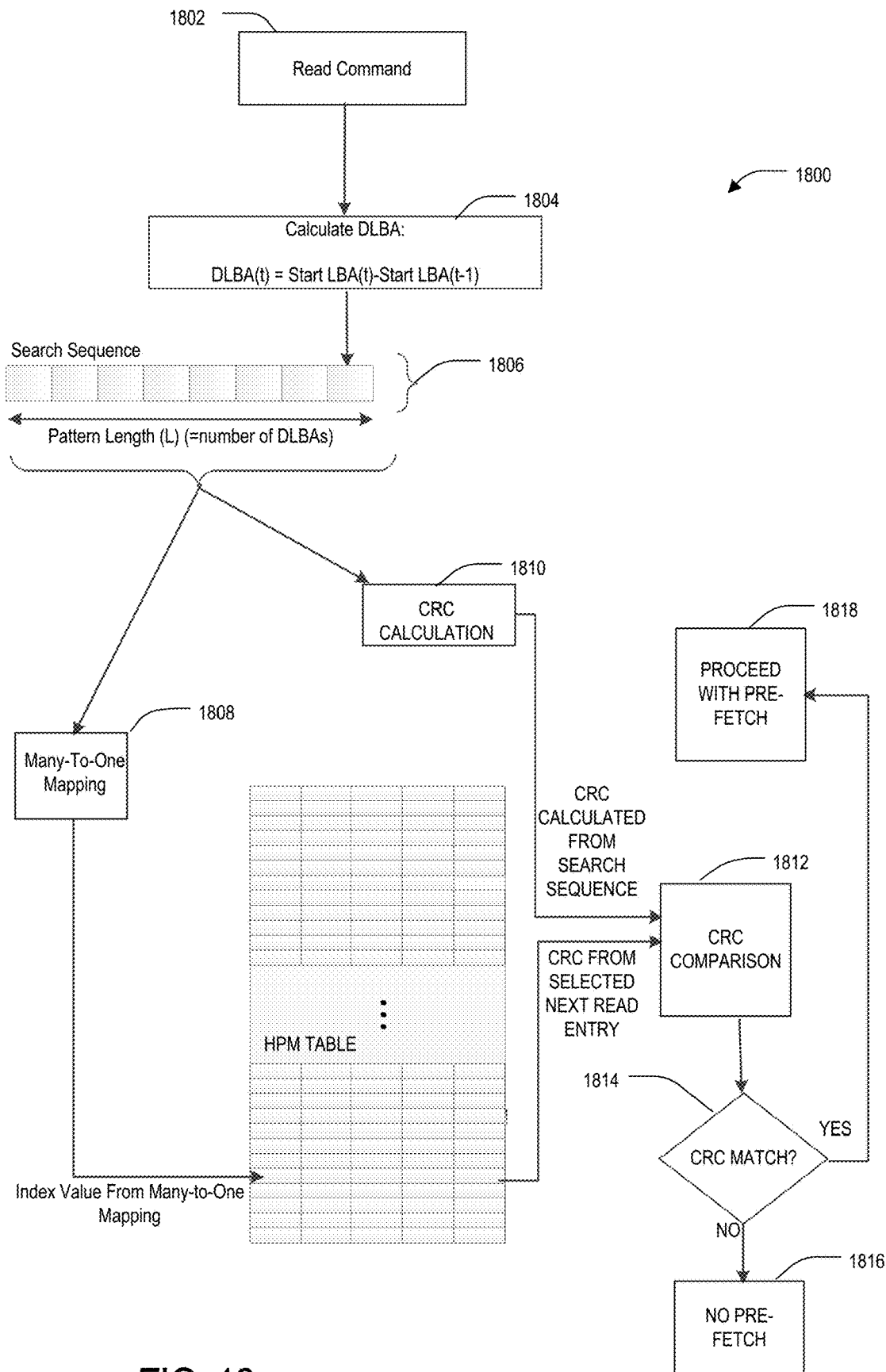
FIG. 18 is a flow diagram 1800 of a read command prediction process using an entry uniqueness marker.

As illustrated in FIG. 18, one such type of uniqueness calculation is a cyclic redundancy check (CRC) calculation. A CRC calculation may be appended as a stamp to each next read prediction entry in a HPM table entry during table updates. The CRC stamp may then be calculated separately from the hash (many-to-one) calculation of the table index value during the read prediction process. Although this CRC "uniqueness verification" may have particular application to pre-fetching data of longer sequences of predicted read commands, it may be useful generally for improving the likely success of selecting the intended next read prediction of single read command predictions in the context of HPM tables. For example, the CRC stamp may permit the controller to avoid prefetching read command when the CRC stamp stored with an entry at the indexed location does not match the expected CRC stamp value.

The CRC stamp used depends on the number of allocated bits for each entry of the HPM table entry. If m bits are allocated for the checksum, then m parity check may be applied to the pattern to produce the m parity bits of the checksum. A common method to produce a checksum is using a CRC based on a polynomial division of the pattern with a degree m primitive polynomial, such that the reminder of division serves as the checksum.

In FIG. 18, a read prediction using a CRC verification is shown. When a read command is received (at 1802), the start LBA in the read command may be converted to a DLBA value (at 1804) in the manner described previously. In other embodiments, the start LBA may be used without calculation and use of a DLBA. A new search sequence is generated (at 1806) in the search sequence buffer 121 by adding in the received read command data (here the calculated DLBA). The controller then creates an index value using a many-to-one mapping function such as a hash (at 1808) and separately performs a CRC calculation on the search sequence (pre-hash) (at 1810). The index value is used to select the table entry in the HPM table and a next read command entry in the table entry is chosen, for example the most recent next read command entry. Additionally, a CRC stamp previously stored in the selected next read entry is retrieved and compared with the CRC calculation made on the search sequence (at 1812).

Assuming that the search sequence originally associated with the selected next read command entry in the table is the same as the current search sequence, the CRC calculation and previously stored CRC should match, in which case the next read command data (DLBA, start LBA and potentially command length information) may be used to proceed with a pre-fetch operation (at 1814, 1818). If, on the other hand, the current search sequence CRC stamp does not match the CRC stamp stored with the next read command entry in a memory element 906, then it is likely that the next read command entry is directed to a different search sequence that has a same index value. Thus, if the CRC information does not match, then the controller may prevent the pre-fetch from moving forward on the memory element 906 containing this next read entry as the next read command entry would likely not be the correct predicted next read for the search sequence (at 1814, 1816).

Figure 19:
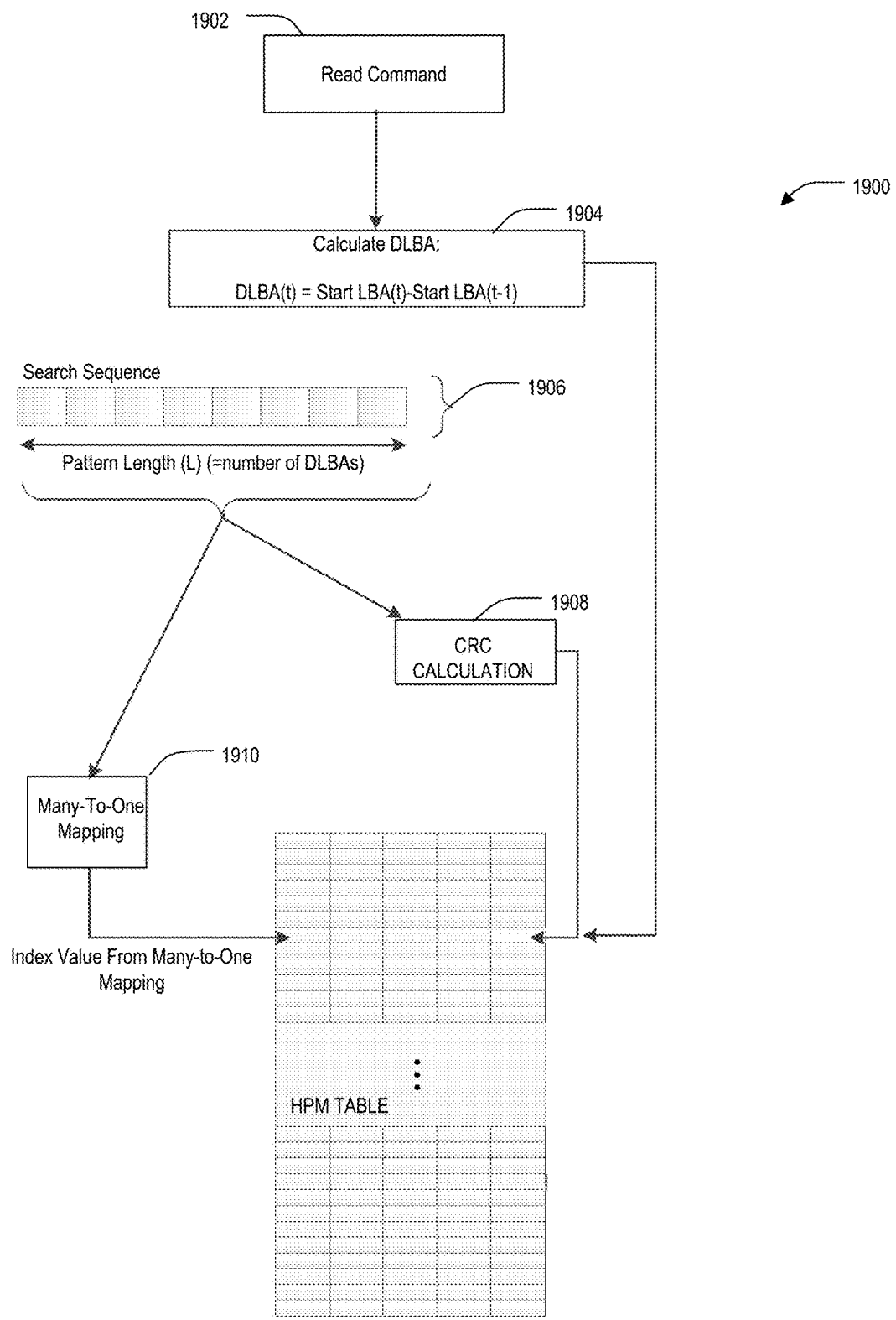
FIG. 19 is a flow diagram 1900 of an update process for a read history pattern matching table using an entry uniqueness marker.

An example of the update procedure for adding the CRC stamp in an HPM table embodiment is shown in FIG. 19. The update for an incoming command preferably occurs prior to the read prediction because, as explained previously, the prior search sequence and/or prior index value mapping made to predict the current read command may be used to store the actual received command before the search sequence and/or index value of the search sequence are overwritten with the actual read command. During the update phase, the read command that is received (at 1902) may be converted to a DLBA value (at 1904) for storage at the appropriate table entry on the HPM table. The appropriate table entry for this read command is the last calculated index value for the search sequence currently in the search sequence buffer 121. If the index value of that search sequence is still available, then the controller may use that to directly identify the correct table entry in which to store the new read command DLBA or other data of that read command. Otherwise, the controller 102 may recalculate the index value from the search sequence still stored in the search sequence buffer (at 1906, 1910). In addition to retrieving or recalculating the index value to identify the correct HPM table entry to update, in this embodiment a CRC calculation is also made on the search sequence to generate a CRC stamp that is then stored in the next read command entry in the identified HPM table entry (at 1906, 1908). As already described with respect to FIG. 18, the CRC stamp acts as a unique search sequence verification check upon read command prediction. In one embodiment, a CRC stamp is calculated and stored for each element 906, 1506 of the each indexed table entry 902, 1502 of the HPM table 900, 1500. Thus, if there are 5 different elements 906, 1506 containing next read commands located at a given table entry (where the calculated index value 904, 1504 is the same for 5 different search sequences), then a unique CRC value is stored in each of the 5 different elements 906, 1506. In this manner, the controller may skip any pre-fetch if no stored CRC of any element 906, 1506 matches the CRC of the current search sequence. Also, the controller may parse the CRC stamps of each element in a table entry corresponding to the determined index value and only pre-fetch the data associated with the element 906, 1506 having a CRC that matches the CRC of the current search sequence in order to improve the accuracy of the prediction.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two-dimensional memory structure or a three-dimensional memory structure.

In a two dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three-dimensional memory array.

By way of non-limiting example, in a three dimensional NAND memory array, the memory elements may be coupled to form a NAND string within a single horizontal (e.g., x-z) memory device levels. Alternatively, the memory elements may be coupled to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional exemplary structures described but cover all relevant memory structures within the spirit and scope of the invention as described herein and as understood by one of skill in the art.

Methods and systems have been disclosed for predicting random read mode data where consecutive read commands are directed to logical addresses that are not contiguous. Multiple solutions for searching for patterns of read commands in historical read command information are presented. The systems and methods disclosed may allow pre-fetching of read command data with improved success rates, and thus overall improvement of input/output operations per second (IOPS) and average operation latency, for a non-volatile memory system.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A memory device comprising:
   a first memory;
   a second memory comprising:
   a search sequence buffer; and
   a prior read command data structure having a plurality of entries representing a read command history of the memory device; and
   a controller in communication with the first memory and the second memory, the controller configured to:
   receive a current read command comprising read command data including a start logical block address (LBA) and a data length, wherein the start LBA of the current read command is discontiguous with an address range associated with a last read command received prior to the current read command;
   generate a search sequence in the search sequence buffer based on at least the current read command, wherein the search sequence comprises the current read command and at least one read command received prior to the current read command;
   calculate an index value based on the search sequence;
   retrieve, from an entry in the prior read command data structure indexed by the calculated index value, address data for a sequence of historical next read commands with the calculated index value; and
   pre-fetch data for the sequence of historical next read commands from the first memory to the second memory based on the retrieved address data.

2. The memory device of claim 1, wherein:
   the prior read command data structure comprises only a predetermined number of entries that are each indexed with a respective index value within a predetermined range of index values.

3. The memory device of claim 1, wherein:
   the first memory comprises non-volatile memory; and
   the second memory comprises volatile memory.

4. The memory device of claim 3, wherein the non-volatile memory comprises a substrate formed with a three-dimensional memory structure.

5. The memory device of claim 1, wherein the search sequence comprises:
   the start LBA of the current read command; and
   a respective start LBA. of each of a predetermined number of prior read commands arranged chronologically in order of read command receipt at the controller.

6. The memory device of claim 1, wherein:
   the search sequence comprises a list, arranged chronologically by time of read receipt at the controller, of differential logical block address (DLBA) information for the current read command and each other of a predetermined number of prior read commands; and
   each DLBA comprises a difference between a start LBA of a respective read command and a start LBA of a last read command received prior to the respective read command.

7. The memory device of claim 1, further comprising a read command counter, wherein the controller, to pre-fetch the data for the sequence of historical next read commands, is further configured to reset the read command counter equal to a number of historical next read commands in the sequence of historical next read commands associated with the search sequence that have been pre-fetched.

8. The memory device of claim 7, wherein the controller is further configured to, responsive to a next read command being received after pre-fetching the sequence of historical next read commands associated with the search sequence:
   determine whether the received next read command is directed to pre-fetched data for one of the sequence of historical next read commands associated with the search sequence; and
   responsive to the received next read command not being directed to the pre-fetched data, initiate a new pre-fetch operation for a new sequence of historical next read commands associated with a new search sequence.

9. The memory device of claim 8, wherein the controller is further configured to:
   responsive to the received next read command being directed to the pre-fetched data, provide the pre-fetched data associated with the received next read command to a host and change a value of the read command counter; and
   responsive to the value of the read command counter indicating that all of the pre-fetched data for the sequence of historical next read commands associated with the search sequence have been processed, initiate the new pre-fetch operation for the new sequence of historical next read commands associated with the new search sequence.

10. A method for predicting multiple random read commands, the method comprising:
   receiving, at a memory device, a current read command for data located at a starting address discontiguous with an address range associated with a last read command received prior to the current read command;

generating, with a controller of the memory device, a search sequence comprising a predetermined plurality of prior read commands including at least the current read command and the last read command, wherein generating the search sequence comprises storing a start logical block address (LBA) for each of the predetermined plurality of prior read commands, arranged chronologically in order of read command receipt at the controller, in a search sequence buffer in the memory device;

calculating, with the controller, based on the search sequence, an index value within a predetermined range of index values, the calculated index value representative of the search sequence, wherein calculating the index value comprises:
applying a value of the search sequence as input for a many-to-one mapping operation and,
processing a result of the many-to-one mapping operation with a modulo operation having an output limited to index values in the predetermined range of index values;

retrieving, from an entry in a prior read command data structure stored in a first memory of the memory device and indexed by the calculated index value, data representative of a predetermined plurality of historical next read commands associated with the calculated index value; and pre-fetching data for each of the predetermined plurality of historical next read commands from a second memory of the memory device to the first memory of the memory device based on the retrieved data representative of the predetermined plurality of historical next read commands associated with the calculated index value.

11. The method of claim 10, wherein many-to-one mapping operation comprises a hash function.

12. The method of claim 10, wherein:
generating the search sequence comprises storing a differential logical block address (DLBA) for each of the predetermined plurality of prior read commands, arranged chronologically in order of read command receipt at the controller, in a search sequence buffer in the memory device, wherein each DLBA comprises a difference between a start logical block address (LBA) of a respective read command and a start LBA of a last read command received prior to the respective read command; and
calculating the index value comprises:
applying a value of the search sequence as input for a many-to-one mapping operation; and
processing a result of the many-to-one mapping operation with a modulo operation having an output limited to index values in the predetermined range of index values.

13. The method of claim 12, further comprising the controller, after pre-fetching the data for each of the predetermined plurality of historical next read commands:
receiving a next read command; and
responsive to the next read command not g directed to the pre-fetched data, initiating a new pre-fetch operation for a new predetermined plurality of historical next read commands associated with a new search sequence.

14. The method of claim 13, further comprising the controller:
responsive to the received next read command being directed to the pre-fetched data:
providing the pre-fetched data associated with the received next read command to a host; and
changing a value of a read command counter in the first memory, the read command counter representative of a number of the sequence of historical read commands that have been processed; and
responsive to the value of the read command counter indicating that all of the pre-fetched data for the predetermined plurality of historical next read commands associated with the search sequence has been processed, initiating the new pre-fetch operation for the new predetermined plurality of historical next read commands associated with the new search sequence.

15. The method of claim 10, further comprising the controller:
receiving next read commands; and
responsive to an order of the next read commands not matching an order of the pre-fetched data for the plurality of historical next read commands, initiating a new pre-fetch operation for a new predetermined plurality of historical next read commands.

16. The method of claim 10, further comprising the controller, after pre-fetching the data for each of the predetermined plurality of historical next read commands:
receiving next read commands; and
responsive to at least two consecutive next read commands not matching any of the pre-fetched data:
discarding the pre-fetched data; and
initiating a new pre-fetch operation for a new predetermined plurality of historical next read commands associated with a new search sequence.

17. The method of claim 10, further comprising:
calculating, with the controller, based on the search sequence, a uniqueness value for the search sequence; and
retrieving the data representative of the predetermined plurality of historical next read commands associated with the calculated index value only responsive to the calculated uniqueness value matching a stored uniqueness value in the entry of the prior read command data structure indexed by the calculated index value.

18. The method of claim 17, wherein:
calculating the index value comprises applying a hash function to the search sequence; and
calculating the uniqueness value comprises applying a cyclic redundancy check function to the search sequence.

19. A memory device comprising:
a first memory;
a second memory comprising:
a search sequence buffer; and
a prior read command data structure having a plurality of entries representing a read command history of the memory device;
means for receiving a current read command comprising read command data including a start logical block address (LBA) and a data length, wherein the start LBA of the current read command is discontiguous with an address range associated with a last read command received prior to the current read command;
means for generating a search sequence in the search sequence buffer based on at least the current read command, wherein the search sequence comprises the current read command and at least one read command received prior to the current read command;
means for calculating an index value based on the search sequence;

means for retrieving from an entry of a prior read command data structure indexed by the calculated index value address data for a sequence of historical next read commands with the calculated index value; and means for pre-fetching data for the sequence of historical next read commands from the first memory to the second memory based on the retrieved address data.

* * * * *